(12) United States Patent
Hinoshita et al.

(10) Patent No.: US 10,471,347 B2
(45) Date of Patent: *Nov. 12, 2019

(54) INFORMATION PROCESSING SYSTEM, INFORMATION PROCESSING APPARATUS, STORAGE MEDIUM STORING INFORMATION PROCESSING PROGRAM, AND INFORMATION PROCESSING METHOD

(71) Applicant: NINTENDO CO., LTD., Kyoto (JP)

(72) Inventors: Wataru Hinoshita, Kyoto (JP); Fumiya Suto, Kyoto (JP); Yuta Ogura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/679,449

(22) Filed: Aug. 17, 2017

(65) Prior Publication Data
US 2018/0341335 A1 Nov. 29, 2018

(30) Foreign Application Priority Data

May 24, 2017 (JP) .................................. 2017-102546
May 24, 2017 (JP) .................................. 2017-102547

(51) Int. Cl.
*G06F 3/02* (2006.01)
*G05G 9/047* (2006.01)
(Continued)

(52) U.S. Cl.
CPC ............ *A63F 13/31* (2014.09); *G06F 3/0213* (2013.01); *A63F 13/44* (2014.09); *G05G 9/047* (2013.01); *G06F 3/038* (2013.01)

(58) Field of Classification Search
CPC .............................. G06F 3/0213; G06F 3/038
(Continued)

(56) References Cited

U.S. PATENT DOCUMENTS 6,081,750 A * 6/2000 Hoffberg .................. G06F 3/00
  700/17
6,144,837 A * 11/2000 Quy ........................ A61B 5/044
  434/307 R (Continued)

FOREIGN PATENT DOCUMENTS

EP 1 541 209 A1 6/2005
EP 1 772 172 A2 4/2007
(Continued)

OTHER PUBLICATIONS

Ogura, et al., U.S. Appl. No. 15/679,440, filed Aug. 17, 2017 (72) pages.

(Continued)

*Primary Examiner* — Prabodh M Dharia
(74) *Attorney, Agent, or Firm* — Nixon & Vanderhye PC

(57) ABSTRACT

A non-limiting example of a first information processing apparatus controls a first object in a virtual space according to an input by a user of the first information processing apparatus, and sends object information about the first object to a second information processing apparatus. The second information processing apparatus receives the object information from the first information processing apparatus. The second information processing apparatus calculates a predicted position that is taken later than a current position of the first object in the first information processing apparatus, based on the received object information, and a delay time in communication between the first information processing apparatus and the second information processing apparatus. The second information processing apparatus executes a game process based on the predicted position. The second information processing apparatus sends result information indicating a result of the game process to the first information processing apparatus.

20 Claims, 20 Drawing Sheets

(51) Int. Cl.
*G06F 3/038* (2013.01)
*A63F 13/31* (2014.01)
*A63F 13/44* (2014.01)

(58) Field of Classification Search
USPC ........ 345/2.1, 156, 173, 426, 501, 594, 629;
463/43; 340/407.2
See application file for complete search history.

(56) References Cited

U.S. PATENT DOCUMENTS

| | | | | |
|---|---|---|---|---|
| 6,147,663 | A * | 11/2000 | Smith | H04N 21/2143 345/2.1 |
| 6,847,852 | B2 * | 1/2005 | Hennion | A61B 8/00 700/37 |
| 8,502,651 | B2 * | 8/2013 | Birnbaum | A63F 13/10 340/407.2 |
| 8,556,729 | B2 * | 10/2013 | Suzuki | A63F 13/12 345/426 |
| 9,940,643 | B2 * | 4/2018 | Lutnick | G06Q 30/02 |
| 2007/0018952 | A1 * | 1/2007 | Arseneau | G06F 1/1626 345/156 |
| 2007/0026371 | A1 * | 2/2007 | Wood | G09B 5/062 434/317 |
| 2007/0078004 | A1 | 4/2007 | Suzuki et al. | |
| 2007/0191106 | A1 | 8/2007 | Sonoda et al. | |
| 2009/0093300 | A1 * | 4/2009 | Lutnick | G07F 17/32 463/26 |
| 2009/0163277 | A1 * | 6/2009 | Russell | G07F 17/32 463/39 |
| 2009/0179917 | A1 * | 7/2009 | Hargreaves | G09G 5/00 345/629 |
| 2010/0022302 | A1 | 1/2010 | Iwakiri et al. | |
| 2011/0122130 | A1 * | 5/2011 | Vesely | G06T 15/20 345/419 |
| 2012/0044255 | A1 * | 2/2012 | Singh | G06F 3/1446 345/594 |
| 2013/0035157 | A1 * | 2/2013 | Weber | G06Q 30/02 463/29 |
| 2013/0050069 | A1 * | 2/2013 | Ota | G06F 3/011 345/156 |
| 2013/0253812 | A1 * | 9/2013 | Masutani | G08G 1/0112 701/118 |
| 2014/0100006 | A1 * | 4/2014 | Jennings | A63B 71/022 463/3 |
| 2014/0213367 | A1 | 7/2014 | Fiedler et al. | |
| 2015/0109185 | A1 | 4/2015 | Shimamura et al. | |
| 2015/0220244 | A1 * | 8/2015 | Vats | G06F 3/04815 715/850 |
| 2018/0341339 | A1 * | 11/2018 | Ogura | G06F 3/0213 |
| 2019/0111340 | A1 * | 4/2019 | Sung | G06Q 30/02 |

FOREIGN PATENT DOCUMENTS

| | | |
|---|---|---|
| EP | 1 815 897 A1 | 8/2007 |
| JP | 2004-280507 | 10/2004 |
| JP | 2006-320502 | 11/2006 |
| JP | 2007-097837 | 4/2007 |
| JP | 2007-215781 | 8/2007 |

OTHER PUBLICATIONS

Extended European Search Report dated Feb. 13, 2018 issued in European Application No. 17187041.3 (8 pages).
Yahn W Bernier: "Latency Compensation Methods in Client/Server In-Game Protocol Design and Optimization", Internet Citation, Mar. 20, 2001 (Mar. 20, 2001), XP002347952, Retrieved from the Internet: URL: San Jose, CA www.gdconf.com/archives/2201/bernier. doc [retrieved on Oct. 6, 2005] (13 pages).
Extended European Search Report dated Feb. 6, 2018 issued in European Application No. 17187045.4 (8 pgs.).

* cited by examiner

INFORMATION PROCESSING SYSTEM, INFORMATION PROCESSING APPARATUS, STORAGE MEDIUM STORING INFORMATION PROCESSING PROGRAM, AND INFORMATION PROCESSING METHOD

CROSS REFERENCE TO RELATED APPLICATIONS

The disclosures of Japanese Patent Application Nos. 2017-102546 and 2017-102547, both filed May 24, 2017, are incorporated herein by reference.

FIELD

The technology disclosed herein relates to information processing systems in which information processing apparatuses communicate with each other to perform a game process, information processing apparatuses, storage medium storing information processing programs, and game processing methods.

BACKGROUND AND SUMMARY

When a game process is executed by a plurality of apparatuses communicating with each other, a delay in the communication has traditionally been taken into consideration during the execution of the game process.

When one (first) information processing apparatus receives information from another (second) information processing apparatus to execute a game process, it is traditionally difficult to synchronize a result of the game process in some cases. For example, there may be a difference in a timing at which a result occurs (e.g., a timing at which an attack hits when a first character controlled in the second apparatus attacks a second character controlled by the first apparatus) between the apparatuses, or there may be a difference in a result itself (e.g., whether or not an attack has successfully hit) between the apparatuses.

With this in mind, the present application discloses an information processing system, an information processing apparatus, a storage medium storing an information processing program, and a game processing method that allow facilitation of synchronization of a result of a game result between information processing apparatuses.

(1) A non-limiting example of an information processing system described herein includes a first information processing apparatus, and a second information processing apparatus configured to communicate with the first information processing apparatus.

The first information processing apparatus has a first control means and a first sending means. The first control means controls a first object in a virtual space according to an input by a user of the first information processing apparatus. The first sending means sends object information about the first object to the second information processing apparatus.

The second information processing apparatus has a first reception means, a prediction means, a processing means, and a second sending means. The first reception means receives the object information from the first information processing apparatus. The prediction means calculates a predicted position that is taken later than a current position of the first object in the first information processing apparatus, based on the received object information, and a delay time in communication between the first information processing apparatus and the second information processing apparatus. The processing means executes a game process based on the predicted position. The second sending means sends result information indicating a result of the game process to the first information processing apparatus.

According to the feature (1), in the second information processing apparatus, the predicted position is calculated, and therefore, a result of the game process can be obtained earlier than in the first information processing apparatus. As a result, an influence caused by a delay that occurs when the result information is sent from the second information processing apparatus to the first information processing apparatus can be reduced, and therefore, the synchronization of a result of the game process between the information processing apparatuses can be facilitated.

(2) The prediction means may repeatedly execute a predicted position calculation process of calculating the predicted position. In the predicted position calculation process, the prediction means may calculate a position that is taken a predetermined time based on the delay time later, and calculate a new predicted position based on the calculated position and a previous predicted position.

According to the feature (2), the second information processing apparatus can accurately calculate the predicted position based on the delay time.

(3) The prediction means may repeatedly execute a predicted position calculation process of calculating the predicted position. The prediction means, when newly receiving the object information, may calculate a new predicted position based on a difference between a position specified by the received object information and a position that is predicted a predetermined time based on the delay time earlier.

According to the feature (3), the second information processing apparatus can calculate the predicted position, taking into consideration the difference between the predicted position calculated in the second information processing apparatus, and an actual position in the first information processing apparatus, and therefore, can more correctly calculate the predicted position.

(4) The prediction means may repeatedly execute a predicted position calculation process of calculating the predicted position. The prediction means may obtain a new predicted position by correcting a predicted position calculated based on a first value based on the delay time, based on a second value based on the delay time, and a position specified by the received object information.

According to the feature (4), the predicted position can be calculated, taking the delay time into consideration, and in addition, the predicted position is corrected based on the received object information and the second value, and therefore, the predicted position can be more correctly calculated.

(5) The prediction means may repeatedly execute a predicted position calculation process of calculating the predicted position. In the predicted position calculation process, the prediction means may calculate a new predicted position by calculating a movement amount based on the delay time, and moving a previous predicted position based on the calculated movement amount. The prediction means may calculate a new predicted position using a movement amount obtained by combining a movement amount in a previous predicted position calculation process, and a movement amount calculated in a current predicted position calculation process, at a predetermined ratio.

According to the feature (5), a sharp change in the predicted position repeatedly calculated by the predicted position calculation process can be prevented or reduced. As a result, the possibility that a result (e.g., an action of an object) of the game process changes sharply can be reduced. Therefore, the possibility that a user feels unnaturalness with respect to a process result can be reduced.

(6) The first control means may cause the first object to perform a first action according to the input. The second information processing apparatus may further have a second control means. The second control means may control an action of the first object in the second information processing apparatus based on the predicted position so that a time it takes to complete the first action in the second information processing apparatus is shorter than a time it takes to complete the first action in the first information processing apparatus.

According to the feature (6), an influence of a delay occurring when the result information is sent from the second information processing apparatus to the first information processing apparatus can be reduced, and therefore, the synchronization of a result of the game process between the information processing apparatuses can be facilitated.

(7) The second control means may cause the first object to perform the first action while skipping a portion of the first action.

According to the feature (7), a period of time during which the first action is performed in the second information processing apparatus is easily reduced. As a result, an influence caused by the delay is easily reduced. Therefore, the synchronization of a result of the game process between the information processing apparatuses can be facilitated.

(8) The first control means may cause the first object to perform a second action according to the input. When a result occurs due to the second action of the first object in the second information processing apparatus, the second sending means may send the result information to the first information processing apparatus. The first information processing apparatus may have a second reception means and a result display means. The second reception means may receive the result information from the second information processing apparatus. The result display means may display an image representing a result of the game process based on the received result information.

According to the feature (8), the first information processing apparatus displays a result of the game process based on the result information received from the second information processing apparatus. Therefore, the first information processing apparatus and the second information processing apparatus can have the same process result.

(9) The second control means may further control a second object in the virtual space according to an input by a user of the second information processing apparatus. The processing means may execute, as the game process, a process of determining whether or not the second object has been affected by the second action of the first object. The second sending means may send information indicating whether or not the second object has been affected by the second action of the first object, as the result information, to the first information processing apparatus.

According to the feature (9), the first information processing apparatus and the second information processing apparatus can have the same result of the determination of whether or not the second object has been affected by the second action of the first object.

(10) The first sending means may send the object information containing information indicating the input by the user of the first information processing apparatus, to the second information apparatus.

According to the feature (10), the second information processing apparatus can more accurately calculate the predicted position based on the input to the first information processing apparatus.

Note that a non-limiting example of the first and second information processing apparatuses having the features (1)-(10) is herein disclosed. In addition, disclosed herein is a non-limiting example storage medium storing an information processing program that causes a computer of the second information processing apparatus (or the first information processing apparatus) to function as each means that is included in the second information processing apparatus (or the first information processing apparatus) having the features (1)-(10). In addition, disclosed herein is a non-limiting example game processing method executable in the information processing system having the features (1)-(10).

According to the information processing system, the information processing apparatus, the storage medium storing the information processing program, and the game processing method, the synchronization of a result of a game process between information processing apparatuses can be facilitated.

These and other objects, features, aspects and advantages of the present exemplary embodiment will become more apparent from the following detailed description of the present exemplary embodiment when taken in conjunction with the accompanying drawings.

DETAILED DESCRIPTION OF NON-LIMITING EXAMPLE EMBODIMENTS

1. Configuration of Information Processing System

An information processing system, information processing apparatus, game program, and game process method according to this non-limiting example embodiment will now be described. Firstly, an entire configuration of the information processing system according to this non-limiting example embodiment, and information processing apparatuses included in the information processing system, will be described.

Figure 1:
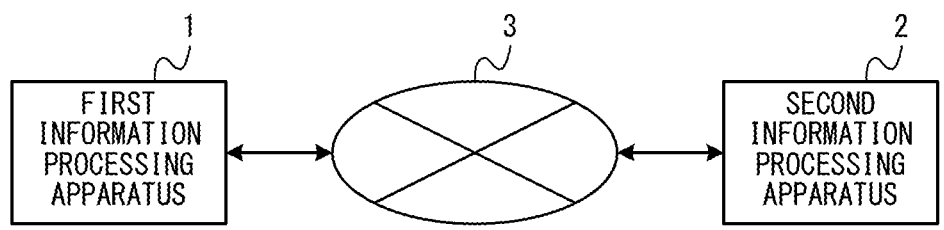
FIG. 1 is a block diagram showing a non-limiting example configuration of an information processing system according to a non-limiting example embodiment.

FIG. 1 is a block diagram showing a non-limiting example configuration of the information processing system of this non-limiting example embodiment. As shown in FIG. 1, the information processing system includes a first information processing apparatus 1 and a second information processing apparatus 2. The first information processing apparatus 1 and the second information processing apparatus 2 can communicate with each other via a network 3. The network 3 is, for example, the Internet, or alternatively, any other networks, such as a LAN, a mobile telephone communication network, etc. In this non-limiting example embodiment, each of the information processing apparatuses 1 and 2 exchanges data with the other to execute a game process. Note that the number of information processing apparatuses included in the information processing system may be any of two or more. Any communication technique may be used between the information processing apparatuses (see (4. Advantageous Effects and Variations of This Non-limiting Example Embodiment)).

In the description that follows, when the first information processing apparatus 1 and the second information processing apparatus 2 are not distinguished from each other, the first information processing apparatus 1 and the second information processing apparatus 2 may be collectively referred to as the "information processing apparatuses."

Figure 2:
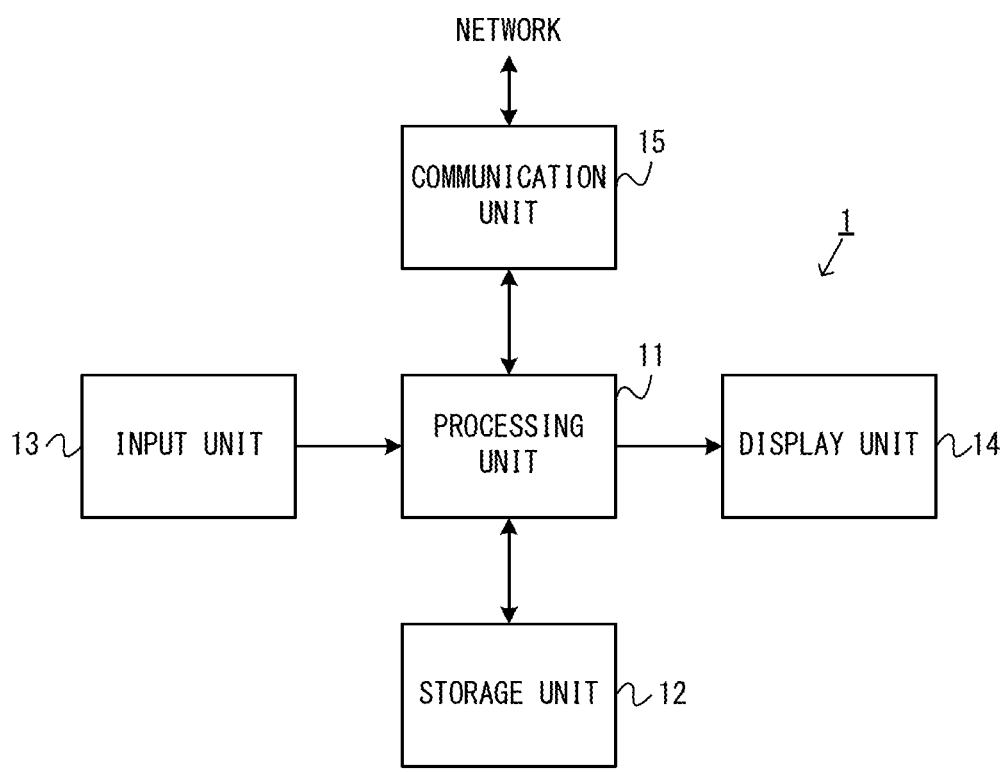
FIG. 2 is a block diagram showing a non-limiting example configuration of a first information processing apparatus.

FIG. 2 is a block diagram showing a non-limiting example configuration of the first information processing apparatus 1. As shown in FIG. 2, the first information processing apparatus 1 includes a processing unit 11 and a storage unit 12. The processing unit 11 is electrically coupled to units 12-15 of the first information processing apparatus 1. The processing unit 11 has a CPU and a memory. In the first information processing apparatus 1, the CPU executes a program (in this non-limiting example embodiment, a game program) stored in the storage unit 12 using the memory to execute various information processes. The storage unit 12 stores programs that are executed by the processing unit 11, data that is used in an information process by the processing unit 11, data that is obtained by the information process, etc. Note that the storage unit 12 may be a storage medium that is removably attached to the first information processing apparatus 1 (e.g., a card-type storage medium).

The first information processing apparatus 1 includes an input unit 13. The input unit 13 may be any input device. The input unit 13 may be, for example, an operation device, such as a button, a stick, etc., or alternatively, a touchscreen or a mouse. Alternatively, the input unit 13 may be an inertial sensor, such as an acceleration sensor or a gyroscopic sensor, or alternatively, a microphone or a camera. The input unit 13 may be provided in another apparatus (e.g., a game controller) separated from the main body of the first information processing apparatus 1 including the processing unit 11, or alternatively, may be a device that wirelessly communicates with the main body of the first information processing apparatus 1.

The first information processing apparatus 1 includes a display unit 14. The display unit 14 displays an image (e.g., a game image, etc.) that is produced by the processing unit 11 of the first information processing apparatus 1 executing an information process. The display unit 14 may be provided in another apparatus (e.g., a display device, such as a television, etc.) separated from the main body of the first information processing apparatus 1 including the processing unit 11.

The first information processing apparatus 1 includes a communication unit (in other words, transceiver) 15. In this non-limiting example embodiment, the communication unit 15 has a function of connecting to a wireless LAN using, for example, a Wi-Fi authenticated communication module. The processing unit 11 connects to the network 3 via a wireless LAN using the communication unit 15 (in other words, through the communication unit 15), and communicates with another apparatus (e.g., the second information processing apparatus 2, etc.). Note that the communication unit for allowing the first information processing apparatus 1 to communicate with another apparatus may have any suitable configuration. The communication unit 15 may, example, have a function of performing short-range wireless communication in accordance with the Bluetooth (registered trademark) standard, or a function of connecting to a mobile communication network (in other words, a mobile telephone communication network) for communication. The communication unit 15 may have two or more of the above communication functions.

Although not shown, the second information processing apparatus 2 includes the units shown in FIG. 2 like the first information processing apparatus 1. Note that the second information processing apparatus 2 does not need to have exactly the same configuration as that of the first information processing apparatus 1. The first information processing apparatus 1 and the second information processing apparatus 2 may be of different types. For example, the first information processing apparatus 1 may be a smartphone while the second information processing apparatus 2 may be a hand-held game console. Alternatively, the first information processing apparatus may be a hand-held game console while the second information processing apparatus 2 may be a stationary game console.

2. Overview of Game Process

Next, a game process that is executed by each of the information processing apparatuses 1 and 2 will be outlined with reference to FIGS. 3-14. In this non-limiting example embodiment, the information processing apparatuses execute a game process for a networked game (or an online game). Specifically, the information processing apparatuses exchange game information with each other, and execute a game process based on the received game information.

In this non-limiting example embodiment, a game process that is executed when a networked game that is a kind of fighting game is performed in the information processing apparatuses 1 and 2, will be described as a non-limiting example. Specifically, in this non-limiting example embodiment, in this game, an object fights an opponent object using a punch action described below. Note that, in other non-limiting example embodiments, the networked game performed by the information processing apparatuses 1 and 2 may have any suitable content (see (4. Advantageous Effects and Variations of This Non-limiting Example Embodiment)).

Figure 3:
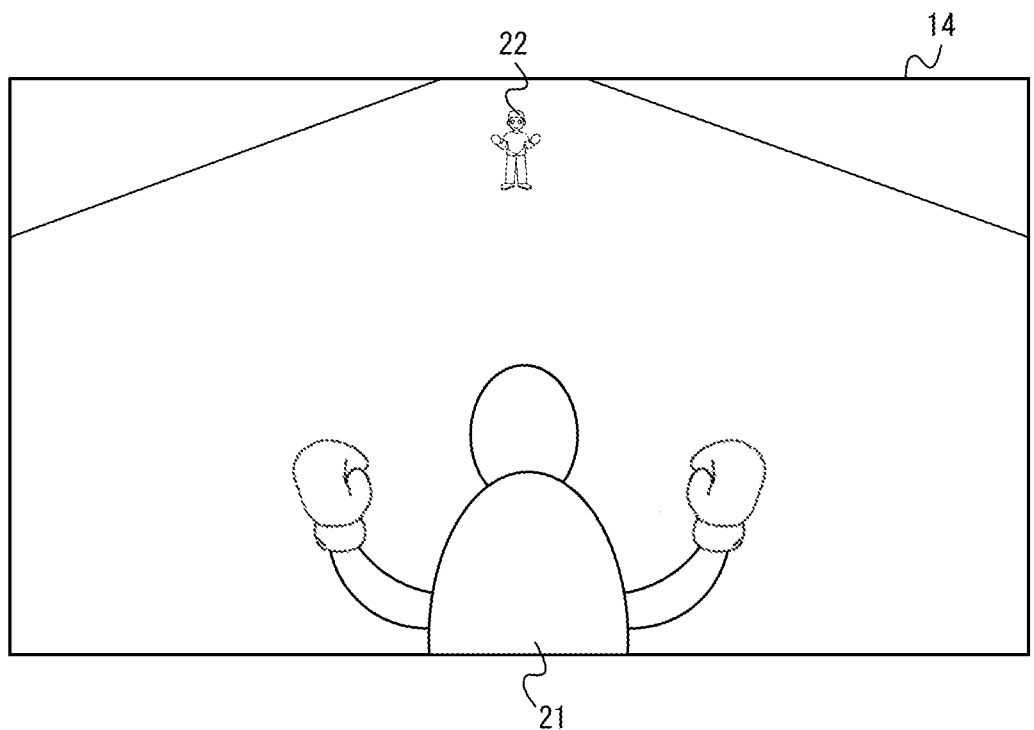
FIG. 3 is a diagram showing a non-limiting example game image that is displayed by the first information processing apparatus.

FIG. 3 is a diagram showing a non-limiting example game image that is displayed by the first information processing apparatus 1. As shown in FIG. 3, in this non-limiting example embodiment, a first object 21 and a second object 22 appear in a virtual game space. A game image representing the game space is displayed on the display unit 14. The first object 21 is an object (in other words, a player character or a player's avatar) that is controlled by a user of the first information processing apparatus 1. Specifically, an action of the first object 21 is controlled according to an input to the first information processing apparatus 1 (more specifically, the input unit 13). The second object 22 is controlled by a user of the second information processing apparatus 2. An action of the second object 22 is controlled according to an input to the second information processing apparatus 2 (more specifically, the input unit).

In the description that follows, when the first object 21 and the second object 22 are not distinguished from each other, objects (specifically, the first object 21 and the second object 22) that are to be controlled by information processing apparatuses may be collectively referred to as "objects to be controlled."

As shown in FIG. 3, in the first information processing apparatus 1, a game image containing the second object 22 (an opponent) is displayed. Although not shown, in the second information processing apparatus 2, a game image containing the first object 21 is displayed. Thus, in this non-limiting example embodiment, an information processing apparatus displays, on a display unit thereof, a game image containing an opponent object (i.e., an object to be controlled whose action is controlled according to an input to another information processing apparatus that communicates with that information processing apparatus). Note that, in this non-limiting example embodiment, an information processing apparatus displays its own object (i.e., an object to be controlled whose action is controlled according to an input to that information processing apparatus) in addition to an opponent object. Note that, in other non-limiting example embodiments, an information processing apparatus may display a game image that does not contain its own object (e.g., a game image from a first-person viewpoint).

(2-1. Punch Action)

Next, a punch action that is performed by an object to be controlled will be described with reference to FIGS. 4-6. In this non-limiting example embodiment, an object to be controlled performs a punch action against an opponent object according to an input to an information processing apparatus. A process that is executed when the first object 21 performs a punch action against the second object 22 will now be described as a non-limiting example (the same applies to the descriptions of FIG. 7 and following figures). Note that a similar process is executed when the second object 22 performs a punch action against the first object 21.

The first object 21 performs a punch action in response to reception of a punch input by the input unit 13. Here, the punch input may be any type of input, such as pressing a button of the input unit 13, etc. Alternatively, if a user is holding an input device serving as the input unit, the punch input may be the user's operation to move the input device (e.g., an operation to move a hand holding the input device forward like a punch). Note that the first information processing apparatus 1 can detect such a punch input on the basis of a result of detection performed by an inertial sensor serving as the input unit.

Note that, in this non-limiting example embodiment, an object to be controlled is caused to perform a travel action, a jump action, and a guard action (i.e., an action to block a punch), in addition to a punch action, depending on an input to an information processing apparatus. Note that any suitable technique for causing an object to be controlled to perform these actions may be employed.

The first information processing apparatus 1 causes the first object 21 to start performing a punch action in response to the punch input. Here, in this non-limiting example embodiment, a punch action includes a preliminary action and a main action. Therefore, in response to the punch input, the first object 21 performs the preliminary action first, and thereafter, performs the main action.

Figure 4:
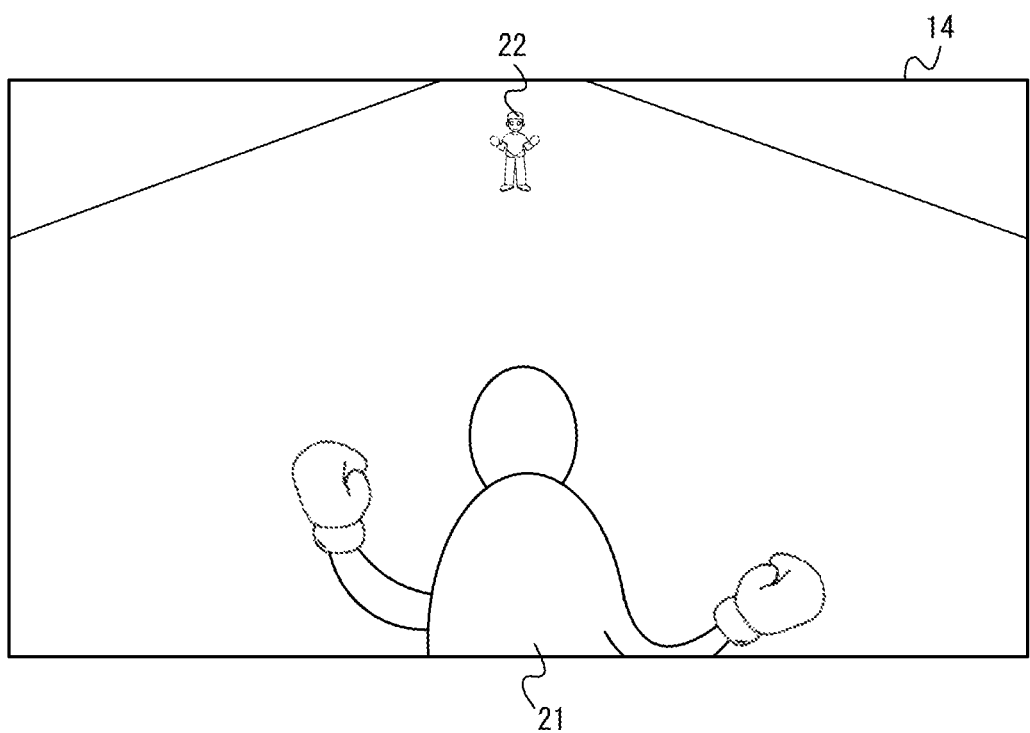
FIG. 4 is a diagram showing a non-limiting example of a first object that is performing a preliminary action.

FIG. 4 is a diagram showing a non-limiting example of the first object 21 that is performing the preliminary action. As shown in FIG. 4, in this non-limiting example embodiment, the preliminary action that is performed by an object to be controlled is to pull one of their arms back.

Figure 5:
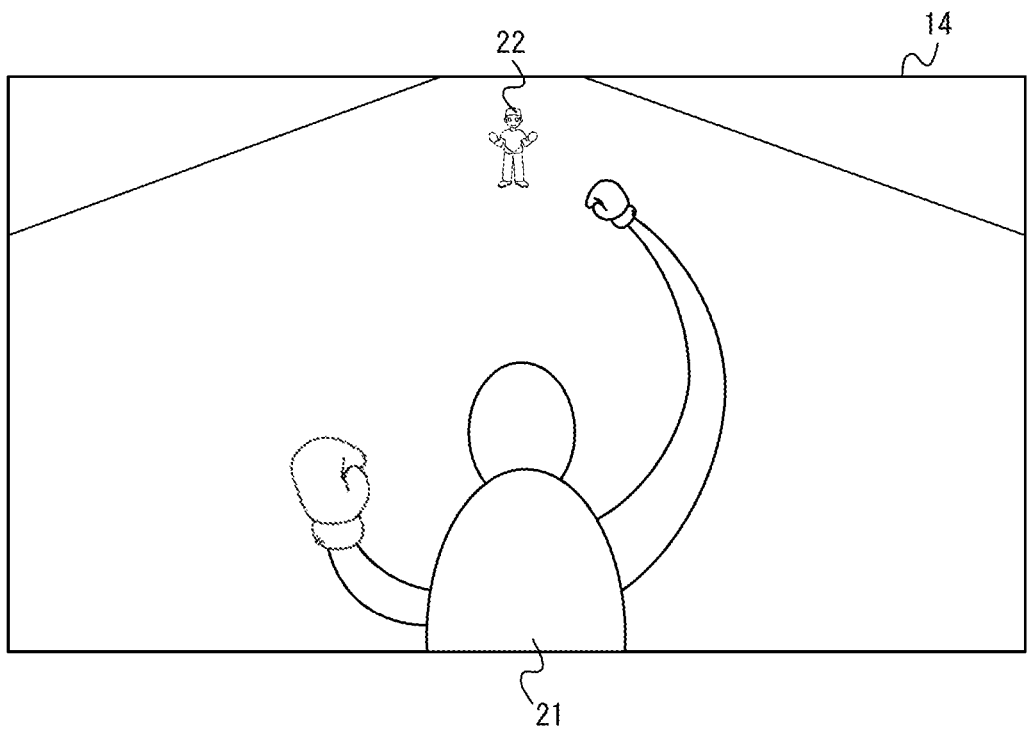
FIG. 5 is a diagram showing a non-limiting example of the first object that is performing a main action.

FIG. 5 is a diagram showing a non-limiting example of the first object 21 that is performing the main action. The first information processing apparatus 1 causes the first object 21 to perform the main action, following the preliminary action. As shown in FIG. 5, in this non-limiting example embodiment, the main action that is performed by an object to be controlled is to extend its arm and thereby move its hand forward (in other words, toward an opponent object).

In this non-limiting example embodiment, an information processing apparatus performs a hit determination process with respect to its own object against a punch action performed by an opponent object. Specifically, an information processing apparatus performs a process of determining whether or not an opponent object's hand in a punch action has hit its own object. Note that, in this non-limiting example embodiment, an information processing apparatus performs the hit determination process in the main action, but not in the preliminary action. Therefore, the preliminary action does not affect a game (or has less influence on a game, compared to the main action).

Furthermore, in this non-limiting example embodiment, an information processing apparatus changes the movement direction of the hand of its own object to be controlled in the main action, depending on an input to the information processing apparatus. Specifically, the first information processing apparatus 1 receives an input that specifies a direction (e.g., using a stick, or tilting an input device), and changes the movement direction of the hand to the specified direction. For example, when an input is made to specify a right direction during the main action, the hand of an object to be controlled moves forward, gradually bending to the right, i.e. in a rightward curve. Note that, in other non-limiting example embodiments, an information processing apparatus may not receive an input to change the movement direction of the hand of an object to be controlled during the main action (see (4. Advantageous Effects and Variations of This Non-limiting Example Embodiment)).

Figure 6:
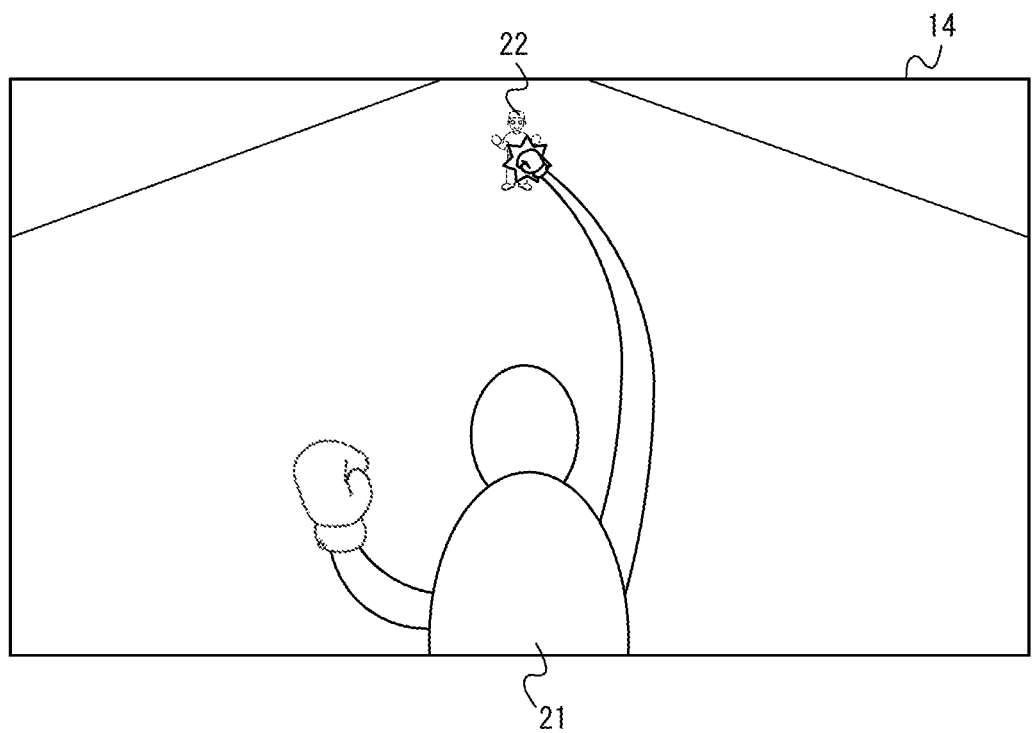
FIG. 6 is a diagram showing a non-limiting example situation where a punch thrown by the first object has hit a second object.

FIG. 6 is a diagram showing a non-limiting example situation where a punch thrown by the first object 21 has hit the second object 22. As described above, the hit determination process is executed to determine whether or not a punch has hit during the main action (i.e., whether or not the hand of the first object 21 has come into contact with the second object 22). If the result of the hit determination process is positive, the information processing apparatuses display the result that the punch has hit. Specifically, although not shown in FIG. 6, in the above case, the second object 22 performs an action to react to the punch (see a portion (d) of FIG. 9). Also, in the above case, an effect image that indicates that the punch has hit the second object 22 is displayed (see FIG. 6). Also, in the above case, the information processing apparatuses execute a process of changing a parameter of the second object (e.g., a process of reducing the physical strength of the second object 22).

Note that, although not shown, during a punch action that is performed by the first object 21, the second object 22 can block a punch by a guard action or avoid a punch by a travel action and/or a jump action, according to an input to the second information processing apparatus 2.

When the second object 22 has blocked a punch, it is determined in the hit determination process that the punch has been blocked. In this case, the second object 22 does not perform a reaction, and an effect image indicating that the punch has been blocked is displayed as a result that the punch has hit. Note that the effect image displayed when a punch has hit may or may not be the same as the effect image displayed when a punch has been blocked. When the second object 22 has blocked a punch, the process of changing the parameter of the second object is not executed.

Note that, in the description that follows, when a punch has hit or when a punch has been blocked may be collectively referred to as a "case where a result of a punch action has occurred." Although described in detail below, an information process is executed so that a punch action has the same result in the two information processing apparatuses 1 and 2 in this non-limiting example embodiment.

When the second object 22 has avoided a punch, it is not determined in the hit determination process that the punch has hit, and a result that a punch has hit is not displayed. Note that the arm of an object to be controlled in a punch action returns to its original length after a punch has hit the second object 22 or the arm has been extended to a predetermined length. Specifically, in these cases, the hand of the first object 21 moves back to its original position (i.e., a position before a punch action is performed).

(2-2. Flow of Process Involved with Punch Action)

Figure 7:
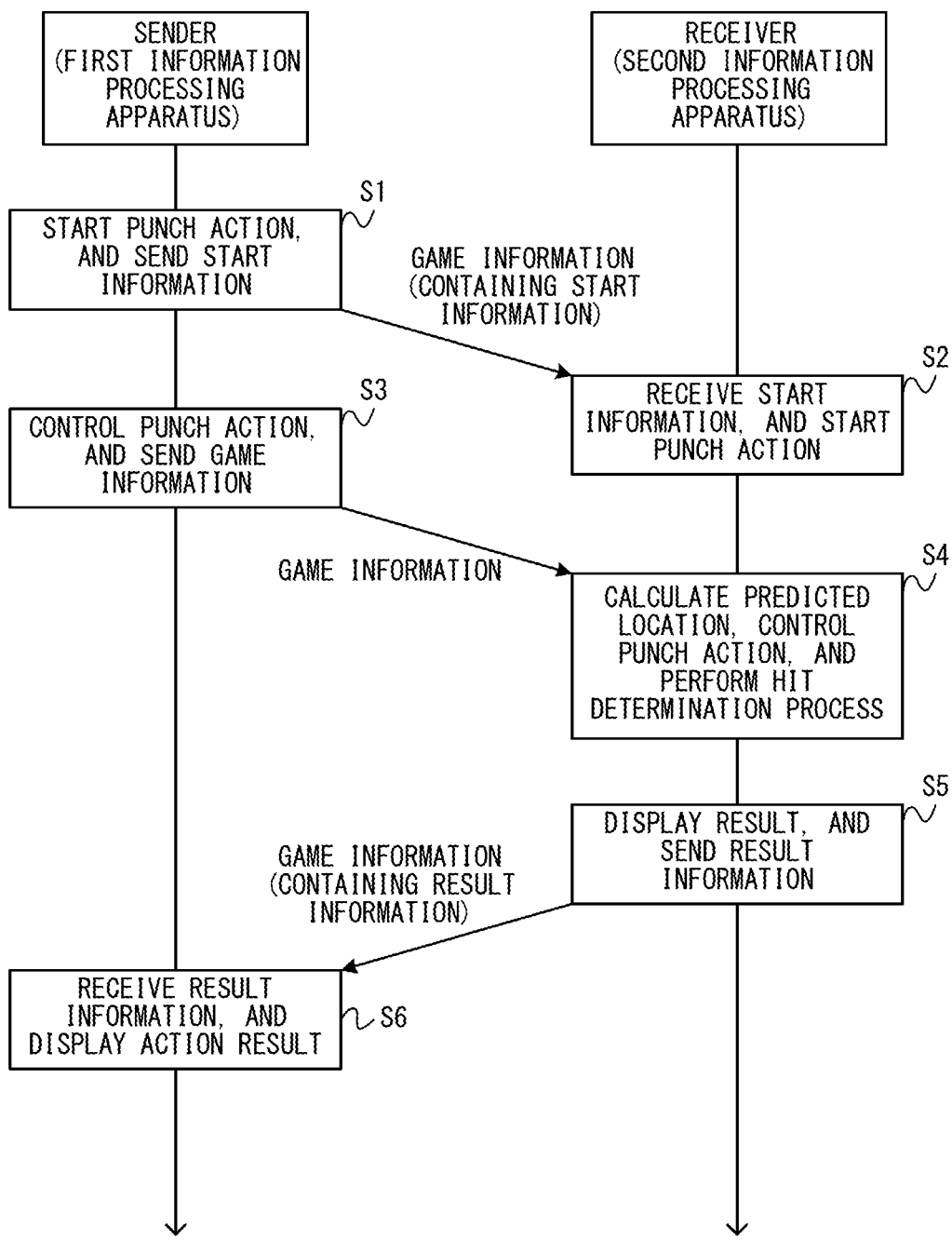
FIG. 7 is a timing chart showing a non-limiting example flow of a process executed in each information processing apparatus with respect to a punch action.

Next, a flow of a game process executed in each of the information processing apparatuses 1 and 2 with respect to a punch action will be described with reference to FIG. 7. FIG. 7 is a timing chart showing a non-limiting example flow of a process executed in each information processing apparatus with respect to a punch action.

Initially, when a punch input is received, the first information processing apparatus 1 (in other words, an information processing apparatus serving as a sender (also referred to as a sender information processing apparatus)) controls the action of the first object 21 so that the first object 21 starts a punch action (step S1). Therefore, in the first information processing apparatus 1, a situation where the first object 21 starts a punch action is displayed at the time of execution of step S1.

Also, in step S1, the first information processing apparatus 1 sends game information containing start information to the second information processing apparatus 2. Here, the start information (in other words, data) indicates that an object to be controlled (here, the first object 21) corresponding to a sender (here, the first information processing apparatus 1) has started a punch action.

The game information also contains object information about an object to be controlled. Specifically, the object information contains information about states (e.g., a location, a velocity, and/or an orientation) of an object to be controlled, and input information about an input for the object to be controlled. Note that the input information indicates, for example, an input that is used to control the action of an object to be controlled. Specifically, if an object to be controlled is controlled according to an input to a button and a stick, the input information indicates what is input to the button and the stick. In this non-limiting example embodiment, during a punch action that is performed by an object to be controlled, the object information contains, in addition to the above information, states (e.g., a position, a velocity, and/or an orientation) of the hand of an object to be controlled.

Note that, in this non-limiting example embodiment, an information processing apparatus repeatedly sends the game information to another apparatus at a rate of once per predetermined time (e.g., a frame time). In other words, the game information is sent from a sender apparatus to a receiver apparatus even when a punch action is not being performed. Note that, while the start information and result information described below are contained in the game information only if a condition is satisfied, the object information is inevitably contained in the game information.

When the game information containing the start information is sent from the sender, the second information processing apparatus 2 (in other words, a receiver information processing apparatus) receives the game information (step S2). Furthermore, in step S2, in response to the reception of the start information, the second information processing apparatus 2 controls the action of the first object 21 so that the first object 21 starts a punch action. As a result, following the first information processing apparatus 1, the second information processing apparatus 2 displays a situation where the first object 21 starts a punch action.

Note that there is a delay in communication between the first information processing apparatus 1 and the second information processing apparatus 2 (in other words, it takes a time for the game information sent from the first information processing apparatus 1 to be received by the second information processing apparatus 2). Therefore, the first object 21 starts a punch action in the second information processing apparatus 2 later than in the first information processing apparatus 1.

Meanwhile, in the first information processing apparatus 1, after the start of the punch action that is performed by the first object 21, the execution of the control to cause the first object 21 to perform the punch action is continued (step S3). Furthermore, in step S3, the first information processing apparatus 1 repeatedly sends the game information containing the object information to the second information processing apparatus 2. Although not shown in FIG. 7, step S3 is repeatedly executed until a result of the punch action performed by the first object 21 occurs (step S6) or the punch action ends (i.e., the arm of the first object 21 returns to its original length after being extended to a predetermined length).

After starting the punch action of the first object 21, the second information processing apparatus 2 executes a predicted position calculation process (step S4). Although described in detail below, the predicted position calculation process is to predict a position of the hand of an opponent object (here, the first object 21) in a punch action. In this non-limiting example embodiment, the second information processing apparatus 2 executes the predicted position calculation process on the basis of the game information sent from the first information processing apparatus 1, and controls the action of the first object 21 on the basis of the position (i.e., a predicted position described below) of the hand obtained as a result of the predicted position calculation process. Furthermore, in step S4, the second information processing apparatus 2 executes a hit determination process to determine whether or not a punch thrown by the first object 21 has hit the second object 22.

Although not shown in FIG. 7, step S4 is repeatedly executed until a result of the punch action performed by the first object 21 occurs or the punch action ends.

If it has been determined in the hit determination process of step S4 that the punch has hit, or that the punch has been blocked, the second information processing apparatus 2 determines that a result of the punch has occurred. In these cases, the second information processing apparatus 2 displays the result of the punch (step S6). Specifically, if the punch has hit, the second information processing apparatus 2 causes the second object 22 to perform a reaction, and displays an effect image indicating that the punch has hit. If the punch has been blocked, the second information processing apparatus 2 displays an effect image indicating that the punch has been blocked.

Furthermore, in step S6, the second information processing apparatus 2 sends the game information containing the result information to the first information processing apparatus 1. The result information indicates that a result of the punch has occurred. In this non-limiting example embodiment, the result information (in other words, data) indicates that the punch has hit or the punch has been blocked.

When the second information processing apparatus 2 sends the game information containing the result information, the first information processing apparatus 1 receives the game information (step S6). Furthermore, in step S6, the first information processing apparatus 1 displays the result of the punch in response to the reception of the result information (step S6). Specifically, the first information processing apparatus 1 displays the result of the punch (i.e., the punch has hit or the punch has been blocked) according to the content of the result information received from the second information processing apparatus 2.

As described above, in this non-limiting example embodiment, the second information processing apparatus 2 sends the result information to the first information processing apparatus 1 if a predetermined result has occurred due to a punch action of the first object 21 in the second information processing apparatus 2 itself. Thereafter, the first information processing apparatus 1 displays the predetermined result on the basis of the result information received from the second information processing apparatus 2. As a result, the first information processing apparatus 1 displays the same result as that which is displayed by the second information processing apparatus 2. In other words, in this non-limiting example embodiment, the first information processing apparatus 1 and the second information processing apparatus 2 can have the same result of a punch action.

Note that when the second object 22 has avoided a punch thrown by the first object 21 in the second information processing apparatus 2, the result information is not sent, and the first information processing apparatus 1 does not display a result of the punch, like the second information processing apparatus 2. In other words, in this non-limiting example embodiment, when a punch has been avoided, the first information processing apparatus 1 and the second information processing apparatus 2 can have the same result of a punch action, like other cases.

(2-3. Progress of Punch Action in Sender and Receiver)

Figure 8:
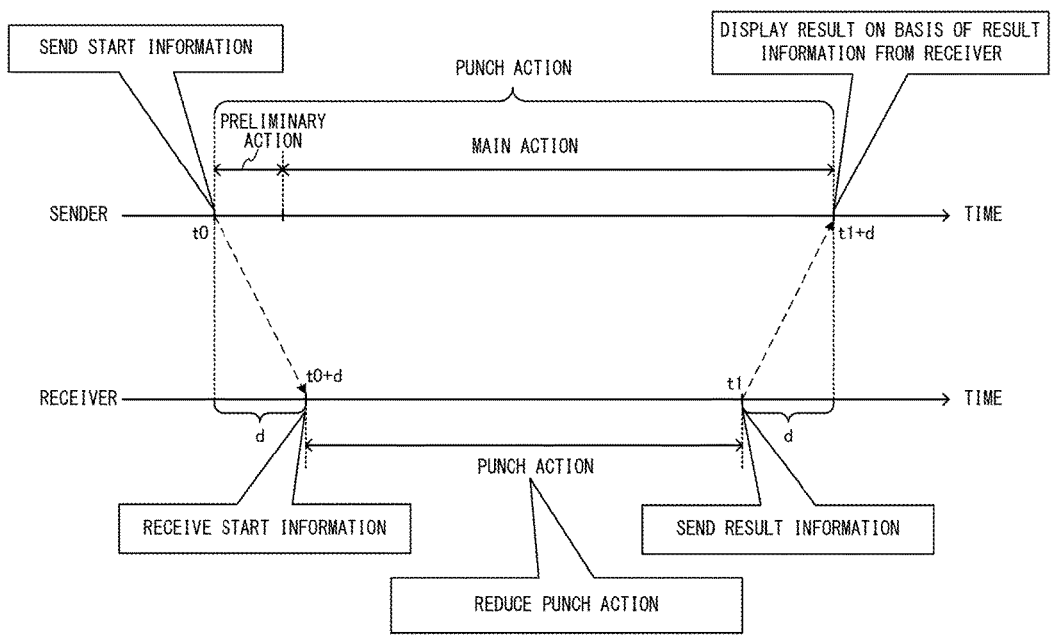
FIG. 8 is a diagram showing a non-limiting example timing at which a punch action starts and a non-limiting example timing at which a result occurs in each of a sender and a receiver.

FIG. 8 is a diagram showing a non-limiting example timing at which a punch action starts and a non-limiting example timing at which a result occurs in each of a sender (here, the first information processing apparatus 1) and a receiver (here, the second information processing apparatus 2).

As shown in FIG. 8, when the first object 21 starts a punch action at a timing t0 in the first information processing apparatus 1, the start information is sent to the second information processing apparatus 2 at the timing to. Here, as described above, there is a delay in communication between the first information processing apparatus 1 and the second information processing apparatus 2. Therefore, in the second information processing apparatus 2, the start information is received at the timing t0+d (d represents a delay time in communication), and the first object 21 starts a punch action at the timing t0+d.

As described above, in this non-limiting example embodiment, in order to allow the information processing apparatuses 1 and 2 to have the same result of a punch action, the second information processing apparatus 2 as a receiver sends the result information indicating a result of a punch action to the first information processing apparatus 1 as a sender. Therefore, as shown in FIG. 8, when a result of the punch action occurs at a timing t1 in the second information processing apparatus 2, the result information is sent to the first information processing apparatus 1 at the timing t1. Thereafter, the first information processing apparatus 1 receives the result information at the timing t1+d, which is delayed from the timing t1 by the delay time d, and displays the result of the punch action at the timing t1+d. Note that, in this non-limiting example embodiment, it is assumed that a delay time that occurs when information is sent from the first information processing apparatus 1 to the second information processing apparatus 2 is the same as a delay time that occurs when information is sent from the second information processing apparatus 2 to the first information processing apparatus 1.

As can be seen from FIG. 8, in this non-limiting example embodiment, a period of time during which the first object 21 performs a punch action (hereinafter referred to as a "punch action period," and specifically, a period of time between when a punch action starts and when a result of a punch action occurs) is shorter in the second information processing apparatus 2 than in the first information processing apparatus 1. Specifically, the punch action period of the second information processing apparatus 2 is shorter than that of the first information processing apparatus 1 by a length of time (in other words, a round-trip delay time) that is double the delay time d.

Here, if it is assumed that a punch action is performed at the same velocity in the information processing apparatuses 1 and 2 (i.e., the hand of a punch moves at the same velocity), an unnatural result is likely to be displayed in the first information processing apparatus 1. A reason for this will be described. In the above assumed case, during a punch action, the position of the hand of the first object 21 in the first information processing apparatus 1 is advanced further than the position of the hand in the second information processing apparatus 2. Therefore, at a timing when the hand of the first object 21 in a punch action hits the second object 22 in the second information processing apparatus 2, the position of the hand of the first object 21 has been advanced further than the position of the hand of the second object 22 in the first information processing apparatus 1. In other words, at the above timing, a punch thrown by the first object 21 has penetrated through the second object 22. If a result is displayed in such a situation, the second object 22 performs a reaction after a punch of the first object 21 has penetrated through the second object 22, for example. Therefore, the user is likely to feel that the displayed result is unnatural.

In this non-limiting example embodiment, in order to reduce the possibility that the above unnatural result is displayed, the information processing system controls the action of the first object 21 in a receiver (here, the second information processing apparatus 2) so that a punch action period in the receiver is shorter than a punch action period in a sender (here, the first information processing apparatus 1). Specifically, the second information processing apparatus 2 which is a receiver predicts a position that will be taken later than the position of the hand of the first object 21 in the first information processing apparatus 1 (in other words, a position that will have been advanced further than the position of the hand in the first information processing apparatus 1) by the predicted position calculation process, and displays the action of the first object 21 in such a manner that the hand of the first object 21 is placed at the predicted position. Specific non-limiting example positions of the hand in a punch action in each of the information processing apparatuses 1 and 2 will now be described with reference to FIG. 9.

Figure 9:
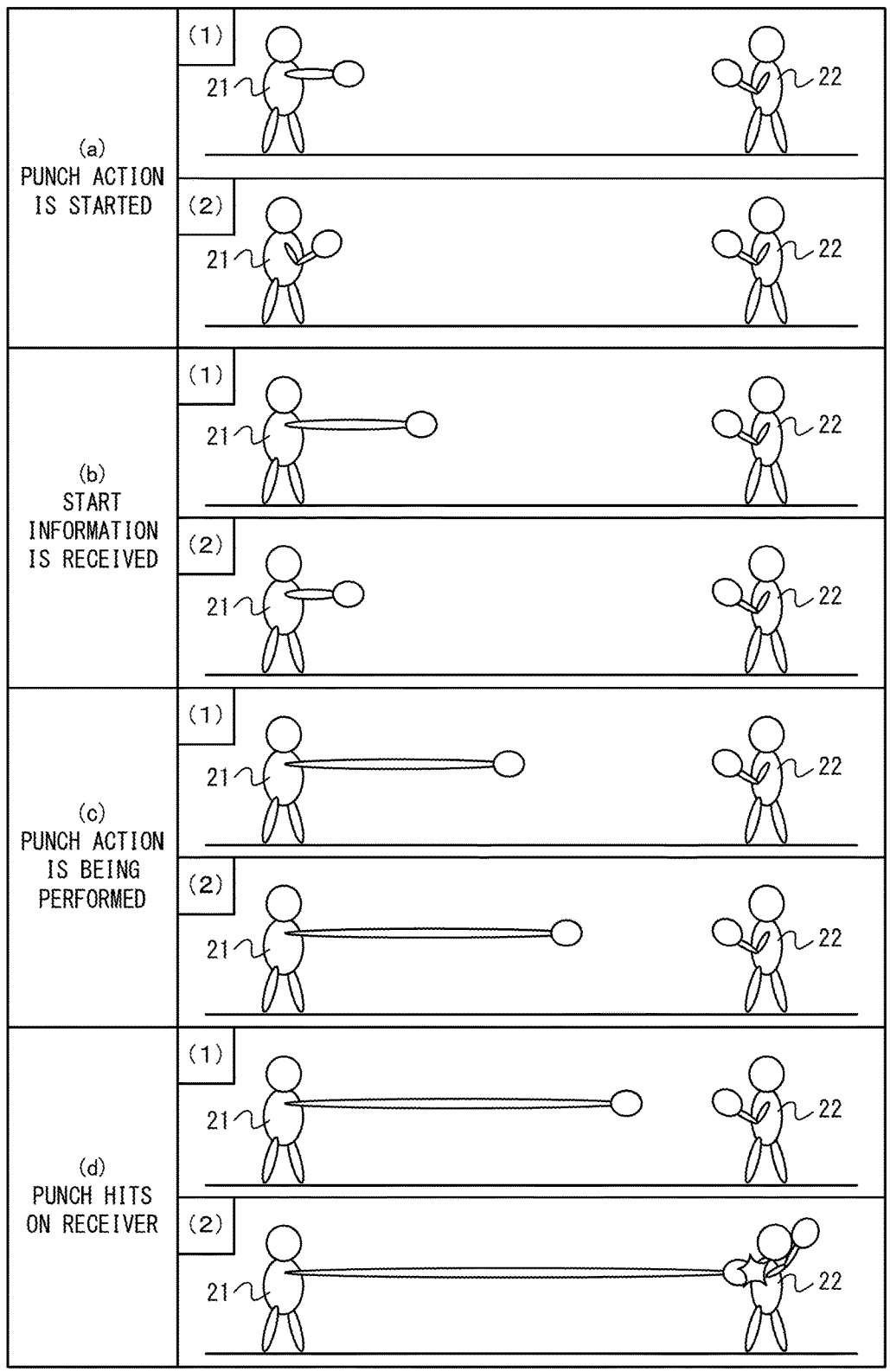
FIG. 9 is a diagram showing non-limiting example punch actions that are performed in a sender and a receiver.

FIG. 9 is a diagram showing non-limiting example punch actions that are performed in a sender and a receiver. Note that, in FIG. 9, a portion (1) indicates a punch action that is performed in the first information processing apparatus 1 as a sender, and a portion (2) indicates a punch action that is performed in the second information processing apparatus 2 as a receiver.

A portion (a) of FIG. 9 indicates a situation where a punch action has been just started in the first information processing apparatus 1. In this situation, the second information processing apparatus 2 has not yet received the start information from the first information processing apparatus 1, and therefore, as shown in FIG. 9, the first object 21 has not started a punch action in the second information processing apparatus 2.

A portion (b) of FIG. 9 indicates a situation where the second information processing apparatus 2 has just received the start information. In this situation, in the first information processing apparatus 1, the position of the hand of the first object 21 has been advanced further than in the situation of the portion (a). Therefore, in the situation of the portion (b), the hand of the first object 21 in the first information processing apparatus 1 is located beyond the hand of the first object 21 in the second information processing apparatus 2.

A portion (c) of FIG. 9 indicates a situation where the punch action has been advanced further from the situation of the portion (b). As described above, in the second information processing apparatus 2, the position of the hand of the first object 21 is predicted by the predicted position calculation process. Therefore, in the situation of the portion (c), the position of the hand of the first object 21 in the second information processing apparatus 2 is located beyond the position of the hand of the first object in the first information processing apparatus 1.

As described above, in this non-limiting example embodiment, the position of the hand in a punch action in the second information processing apparatus 2 is not beyond the position of the hand in the punch action in the first information processing apparatus 1 from the start of the punch action. The predicted position calculation process is executed so that the hand in a punch action in the second information processing apparatus 2 goes past the hand in the punch action in the first information processing apparatus 1, at some point in the punch action. This is because if the hand in a punch action in the second information processing apparatus 2 is located beyond the hand in the punch action in the first information processing apparatus 1 immediately after the start of the punch action, the hand in the punch action is displayed in such a manner that the hand of the first object 21 is suddenly located away from the body, which may cause the user to feel unnaturalness. Therefore, in this non-limiting example embodiment, the second information processing apparatus 2 controls the action of the first object 21 so that the hand in a punch action in the second information processing apparatus 2 goes past the hand in the punch action in the first information processing apparatus 1. Specifically, during an early period of a punch action, control is performed so that the hand in the second information processing apparatus 2 gradually catches up with the hand in the first information processing apparatus 1 (the portion (b) of FIG. 9), and thereafter, control is performed so that the hand in the second information processing apparatus 2 goes past and is located beyond the hand in the first information processing apparatus 1 (the portion (c) of FIG. 9). As a result, a natural punch action can be displayed in the second information processing apparatus 2.

The portion (d) of FIG. 9 shows a situation where the punch thrown by the first object 21 has just hit the second object 22 in the second information processing apparatus 2. At this time, in the second information processing apparatus 2, the second object 22 performs a reaction, and an effect image is displayed (see the portion (d) of FIG. 9). In addition, as shown in the portion (d) of FIG. 9, at this time, the punch thrown by the first object 21 has not yet hit the second object 22 in the first information processing apparatus 1. Thereafter, the second information processing apparatus 2 sends the result information to the first information processing apparatus 1. The first information processing apparatus 1, when receiving the result information, causes the first object 21 to perform a reaction.

Thus, in this non-limiting example embodiment, a result of a punch action occurs earlier in the second information processing apparatus 2, which sends the result information, and the result of the punch action occurs later in the first information processing apparatus 1, which receives the result information. Therefore, an influence that is caused by a delay in communication that occurs when the result information is sent can be reduced, which facilitates synchronization of the display of a result in the first information processing apparatus 1 with the display of the result in the second information processing apparatus 2. For example, if the display of a result in the second information processing apparatus 2 is performed earlier than the display of the result in the first information processing apparatus 1 by the delay time d (or a time longer than the delay time d), the first information processing apparatus 1 can cause the second object 22 to perform a reaction at a timing when the punch thrown by the first object 21 hits the second object 22.

Although a case where a punch thrown by the first object 21 hits the second object 22 has been described as a non-limiting example in FIG. 9, a similar process is executed when a punch thrown by the first object 21 is blocked by the second object 22.

As described above, the second information processing apparatus 2 controls a punch action that is performed by the first object 21 in the second information processing apparatus 2 on the basis of a position (a "predicted position" described below) obtained by the predicted position calculation process so that a time (i.e., a punch action period) it takes to complete the punch action in the second information processing apparatus 2 is shorter than the time it takes to complete the punch action in the first information processing apparatus 1 (more specifically, by about double the delay time). Therefore, a result of a punch action can be displayed in the first information processing apparatus 1 at an appropriate timing (compared to the case where a punch action is performed at the same velocity in the two information processing apparatuses).

(2-4. Skipping of Preliminary Action)

As described above, in this non-limiting example embodiment, it takes a shorter punch action period to complete a punch action of the first object 21 in the second information processing apparatus 2 than in the first information processing apparatus 1. Specifically, the hand of the first object 21 that performs a punch action moves faster in the second information processing apparatus 2 than in the first information processing apparatus 1 (see FIG. 9). Here, if the hand of the first object 21 that performs a punch moves extremely fast, the user of the second information processing apparatus 2 is likely to feel unnaturalness or it is likely to difficult for the user to play a game.

With this in mind, in this non-limiting example embodiment, the second information processing apparatus 2 skips all or a portion of the preliminary action of a punch action that is performed by the first object 21. By skipping the preliminary action, the time it takes to complete the main action can be increased (compared to when all the preliminary action is performed), and therefore, an increase in the punch speed of the main action can be decreased. In other words, in this non-limiting example embodiment, the second information processing apparatus 2 skips the preliminary action of a punch action and thereby increases a period of time during which the main action is performed as much as possible. A process of skipping all or a portion of the preliminary action will now be described in greater detail.

Figure 10:
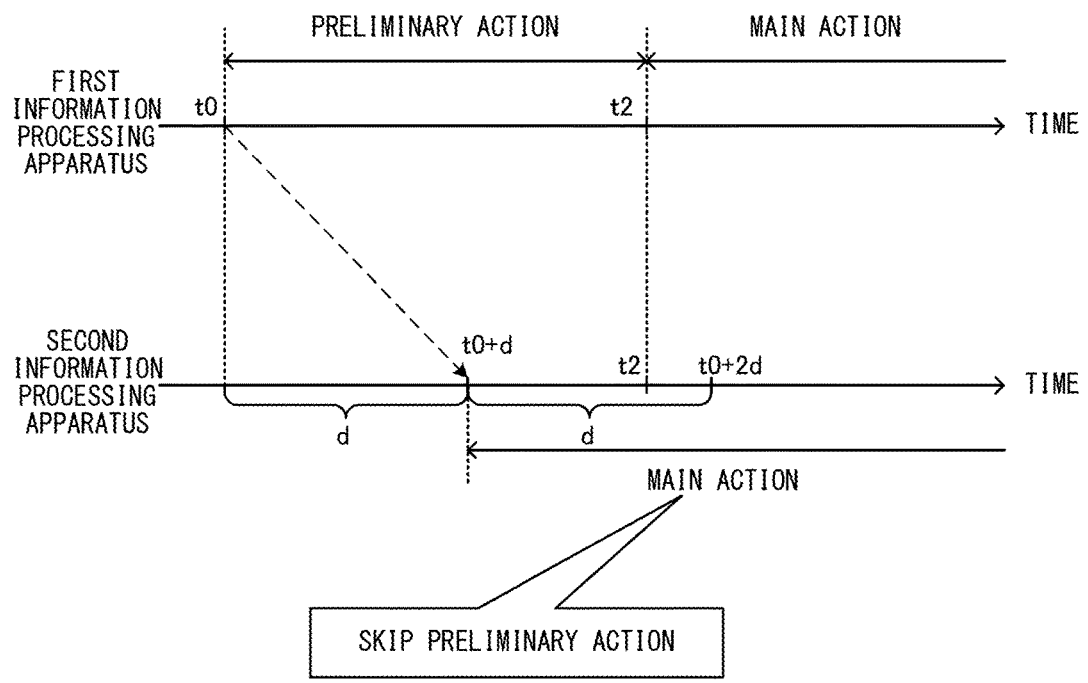
FIG. 10 is a diagram showing a non-limiting example punch action that is performed when a delay time is relatively long.

FIG. 10 is a diagram showing a non-limiting example punch action that is performed when the delay time is relatively long. FIG. 10 shows a case where a reference time point (t0+2d) is later than a time point t2 at which the preliminary action ends in the first information processing apparatus 1. Note that the reference time point (t0+2d) is a time point at which double the delay time d has just elapsed since the timing t0 at which a punch action (in other words, the preliminary action) starts in the first information processing apparatus 1.

If, as shown in FIG. 10, the reference time point (t0+2d) is later than the time point t2 at which the preliminary action ends in the first information processing apparatus 1, the second information processing apparatus 2 controls the action of the first object 21 so that the preliminary action of a punch action is (entirely) skipped. Specifically, the first object 21 starts the main action of the punch action at a time point (t0+d) at which the start information is received in the second information processing apparatus 2.

Figure 11:
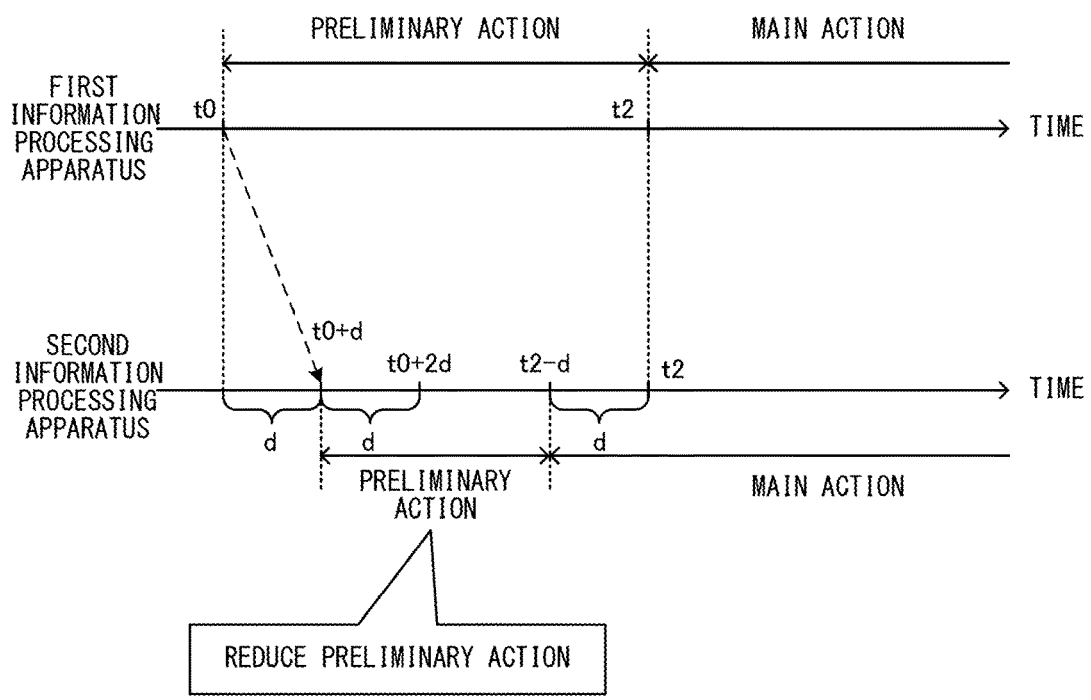
FIG. 11 is a diagram showing a non-limiting example in which a punch action is performed when the delay time is relatively short.

FIG. 11 is a diagram showing a non-limiting example in which a punch action is performed when the delay time is relatively short. FIG. 11 shows a case where the reference time point (t0+2d) is earlier than the time point t2 at which the preliminary action ends in the first information processing apparatus 1. In this case, as shown in FIG. 11, the second information processing apparatus 2 controls the action of the first object 21 so that a portion of the preliminary action is skipped (in other words, the preliminary action is shortened). Specifically, the first object 21 performs a shortened preliminary action so that the preliminary action starts at the time point (t0+d) at which the second information processing apparatus 2 receives the start information, and ends at a time point (t2−d) that is earlier than the time point t2 by the delay time d. In other words, the duration of the preliminary action in the second information processing apparatus 2 is reduced from the duration of the preliminary action in the first information processing apparatus 1 by double the delay time d.

Note that any specific suitable technique for skipping a portion of the preliminary action may be used. For example, the first object 21 takes a predetermined physical position in groups of a predetermined number of frames, and performs the preliminary action by taking the physical positions on a frame-by-frame basis. In this case, the second information processing apparatus 2 may cause the first object 21 to perform the preliminary action while skipping a physical position(s) determined in some of the predetermined number of frames.

As described above, in this non-limiting example embodiment, the second information processing apparatus 2 causes the first object to perform a punch action while skipping a portion (specifically, the preliminary action) of the punch action of the first object. As a result, the punch action period can be reduced in the second information processing apparatus 2, and therefore, the display of a result of the punch action in the first information processing apparatus 1 can be performed at an appropriate timing (compared to the case where the two information processing apparatuses have the same punch action period).

Note that, in this non-limiting example embodiment, the second information processing apparatus 2 determines, in the hit determination process, whether or not the second object 22 has been affected by the main action of a punch action that is performed by the first object 21. In other words, the preliminary action that is performed by the first object 21 does not affect the second object 22. Therefore, in this non-limiting example embodiment, by skipping the preliminary action, a punch action can be shortened while reducing an influence on a game. Note that the influence of the first object on the second object is specifically an influence in a game, and may appear in a display (e.g., the second object reacts to a punch action that is performed by the first object), or may not appear in a display (e.g., the value of the physical strength parameter of the second object is reduced due to a punch action that is performed by the first object).

In this non-limiting example embodiment, the preliminary action that is performed by an object to be controlled is to pull one of their arms back. Therefore, even if the preliminary action is skipped, the user is relatively unlikely to feel unnaturalness (i.e., compared to the case where the main action is skipped). Thus, in this non-limiting example embodiment, by skipping the preliminary action of a punch action, the punch action can be shortened while reducing the possibility that the user feels unnaturalness.

Note that, in other non-limiting example embodiments, an action to be skipped is not limited to the preliminary action. For example, if a series of actions (in this non-limiting example embodiment, a punch action) performed by the first object 21 includes predetermined actions that can be removed, the second information processing apparatus 2 may skip all or a portion of such predetermined actions. In a case where the first object 21 performs a series of actions to fire bullets in quick succession, the predetermined action may be an action to reload bullets at some point in the action. Note that the predetermined action may be any action that a game developer determines can be removed, or an action that has no (or only a small) influence on a game.

As described above, in this non-limiting example embodiment, the second information processing apparatus 2 changes a length of time by which an action (specifically, the preliminary action) that is performed by the first object 21 is skipped, depending on the length of the delay time (see FIGS. 10 and 11). Specifically, in the second information processing apparatus 2, all the preliminary action is skipped when the delay time is relatively long (FIG. 10), and a portion of the preliminary action is skipped when the delay time is relatively short (FIG. 11). In addition, when the delay time is relatively short (FIG. 11), the length of time of a portion of the preliminary action that is skipped varies depending on the delay time. Thus, by changing the length of time of an action to be skipped, depending on the delay time, the second information processing apparatus 2 can have a reduced possibility that an action is skipped more than necessary, and therefore, unnaturalness that is experienced by the user can be reduced.

Note that, in this non-limiting example embodiment, the second information processing apparatus 2 determines whether all or a portion of the preliminary action is to be skipped, on the basis of whether the reference time point (t0+2d) is earlier or later than the time point t2 at which the preliminary action ends in the first information processing apparatus 1. Here, the length of time it takes to complete the preliminary action in the first information processing apparatus 1 (i.e., the length of time from the timing t0 to the time point t2 in FIG. 10) is previously determined. The second information processing apparatus 2 also executes a process of specifying the delay time in communication between the first information processing apparatus 1 and the second information processing apparatus 2 (step S32 described below). Therefore, the second information processing apparatus 2 can specify the reference time point and the end time point on the basis of the predetermined preliminary action period and the specified delay time, and thereby execute the determination process.

Note that, in this non-limiting example embodiment, the reference time point used in the determination process is the time point (t0+2d), but not the time point (t0+d). This is because, in this non-limiting example embodiment, it is intended that the punch action period in the second information processing apparatus 2 is shorter than the punch action period in the first information processing apparatus 1 by 2d.

In the foregoing description with reference to FIGS. 8-11, in order to facilitate the understanding of the processes in this non-limiting example embodiment, it is assumed that the punch action period in the second information processing apparatus 2 is reduced from the punch action period in the first information processing apparatus 1 by double the delay time d (2d). Here, although described in detail below, the length of time by which the punch action period in the second information processing apparatus 2 is reduced does not necessarily need to be double the delay time d, and may be either shorter or longer than double the delay time d in this non-limiting example embodiment. Note that if the punch action period in the second information processing apparatus 2 can be reduced, unnaturalness that the user has in the display of a result of a punch action that is performed by the first information processing apparatus 1 can be reduced, which is similar to the above effect.

(2-5. Specification of Punch Start Position)

As described above, when the preliminary action is skipped in the second information processing apparatus 2 (FIG. 10), the second information processing apparatus 2 specifies a position of the hand of a punch thrown by the first object 21 placed at a time point at which the main action is started (this position is referred to as the "punch start position"). A process of specifying the punch start position will now be described in detail.

Figure 12:
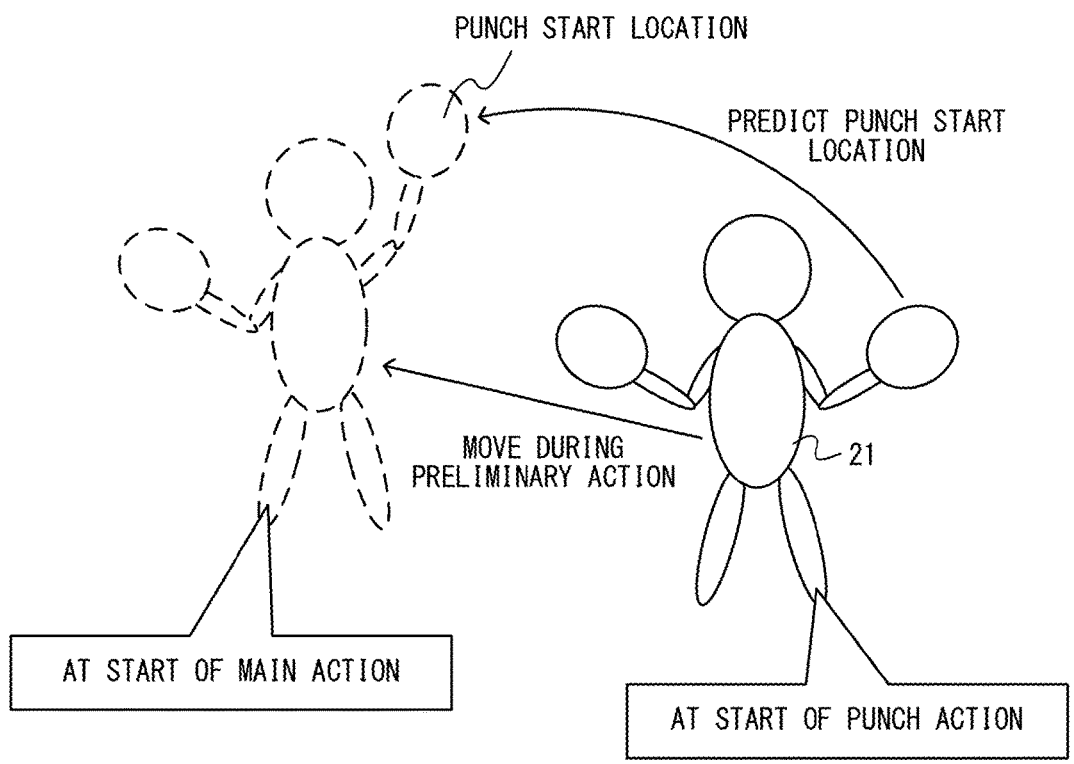
FIG. 12 is a diagram showing non-limiting examples of the first object at a start time point in a punch action and at a start time point in the main action.

FIG. 12 is a diagram showing non-limiting examples of the first object 21 at a start time point in a punch action and at a start time point in the main action. As shown in FIG. 12, the first object 21 is likely to perform an action, such as traveling, etc., in the preliminary action. Therefore, the position of the hand of the first object 21 placed at the start of a punch action (an object represented by a solid line in FIG. 12) is likely to be different from the position of the hand of the first object 21 placed at the start of the main action (an object represented by a dashed line in FIG. 12). Therefore, in this non-limiting example embodiment, the second information processing apparatus 2, when skipping the preliminary action of the first object 21, specifies the position of the hand of the first object 21 placed at the start of a punch action (in other words, at the start of the main action). Thereafter, the second information processing apparatus 2 starts controlling the punch action that is performed by the first object 21 from the situation where the hand is placed at the specified position.

Here, the game information that is received from the first information processing apparatus 1 at the start time point of a punch action in the second information processing apparatus 2 contains the object information about the first object 21 at the start of the punch action in the first information processing apparatus 1 (see FIG. 8). Therefore, the second information processing apparatus 2 specifies the punch start position on the basis of the object information, i.e., information (specifically, information about a position, a velocity, etc.) about the first object 21 at the start of the punch action in the first information processing apparatus 1.

Any suitable technique for specifying the punch start position may be used. For example, the punch start position can be specified by predicting the position of the hand of the first object 21 placed at a time point at which the main action is started in the first information processing apparatus 1, on the basis of the object information. For example, the punch start position may be predicted as a position to which the hand of the first object 21 is moved from the position of the hand of the first object 21 placed at the start of a punch action in a direction corresponding to the direction of the velocity of the first object 21 at the start of the punch action, by a distance corresponding to the velocity and the duration of the preliminary action. Furthermore, the punch start position may be calculated, taking into consideration input information obtained at the start of a punch action (i.e., information about an operational input related to the first object 21). For example, when an input is made to move the first object 21 rightward at the start of a punch action, the second information processing apparatus 2 may calculate, as the punch start position, a position to which the hand of the first object 21 placed at the start of the punch action is moved rightward. Note that the punch start position may be predicted using a commonly used prediction technique.

Note that the second information processing apparatus 2 sets the position of the first object 21 placed at the start of a punch action to a position suitable for the specified punch start position. This can reduce the possibility that the body and the hand of the first object 21 have an unnatural positional relationship.

As described above, in this non-limiting example embodiment, the second information processing apparatus 2, when skipping a portion (specifically, the preliminary action) of an action that is performed by the first object 21, predicts a state (specifically, the punch start position) of the first object 21 after the skipping, and starts controlling the action after the skipping. Therefore, even when the preliminary action is skipped, an action that is performed by the first object 21 can be represented as a natural action. In other words, the punch start position in the second information processing apparatus 2 that corresponds to the position of the first object 21 placed at the start of the main action can be obtained, and therefore, the main action in the second information processing apparatus 2 can be made close (in other words, more correct) to the main action in the first information processing apparatus 1.

If there are a plurality of types of objects to be controlled, the second information processing apparatus 2 may calculate the punch start position for each type of first object 21 using a respective different technique. Specifically, the second information processing apparatus 2 may calculate the punch start position using a prediction function, and in this case, use different functions corresponding to different types of first objects 21 (specifically, functions having different coefficients for different types of first objects 21). A prediction function takes, as inputs, at least some (specifically, the position and velocity of the first object 21, and input information, etc.) of the items of information contained in the object information, and outputs the punch start position. A prediction function may be prepared using any suitable technique, and may be prepared by, for example, experimentation or simulation.

For example, the size, preliminary action motion, and/or preliminary action duration, etc., of an object to be controlled may vary depending on the type of the object. In this case, even when objects to be controlled are in the same state at the start of a punch action, the objects may have different actual punch start positions if the objects are of different types. Therefore, in the above case, the second information processing apparatus 2 prepares different prediction functions for different types of objects to be controlled. For example, if a prediction function has a coefficient related to the position of a shoulder of an object to be controlled (e.g., a coefficient representing a distance between a center position of the object to be controlled and a position of a shoulder), the prediction functions having different such coefficients may be prepared for two objects to be controlled that have different sizes. The second information processing apparatus 2 calculates the punch start position using a prediction function corresponding to the type of an object to be controlled that is selected as the first object 21. As a result, the second information processing apparatus 2 can predict the punch start position with higher accuracy.

(2-6. Technique of Calculating Predicted Position)

A non-limiting example in which a predicted position is calculated in the predicted position calculation process will be specifically described with reference to FIG. 13. The second information processing apparatus 2 repeatedly performs the predicted position calculation process during a period of time that control is performed to cause the first object 21 to perform the main action. Specifically, the predicted position calculation process is executed once in each one-frame process (i.e., a loop of steps S31-S42 described below). In the predicted position calculation process, the second information processing apparatus 2 calculates a predicted position of the hand of the first object 21 that is used to perform a punch action. The second information processing apparatus 2 controls the action of the first object 21 so that the hand is placed at the calculated predicted position.

Note that, in the predicted position calculation process, the object information contained in the game information received from the first information processing apparatus 1 is used to predict a position (in other words, a future position) that will be taken later than a position indicated by the object information. Therefore, as used herein, a position calculated by the predicted position calculation process is referred to as a "predicted position." Note that, in the second information processing apparatus 2, the hand of the first object 21 that is actually placed at a predicted position is displayed.

Figure 13:
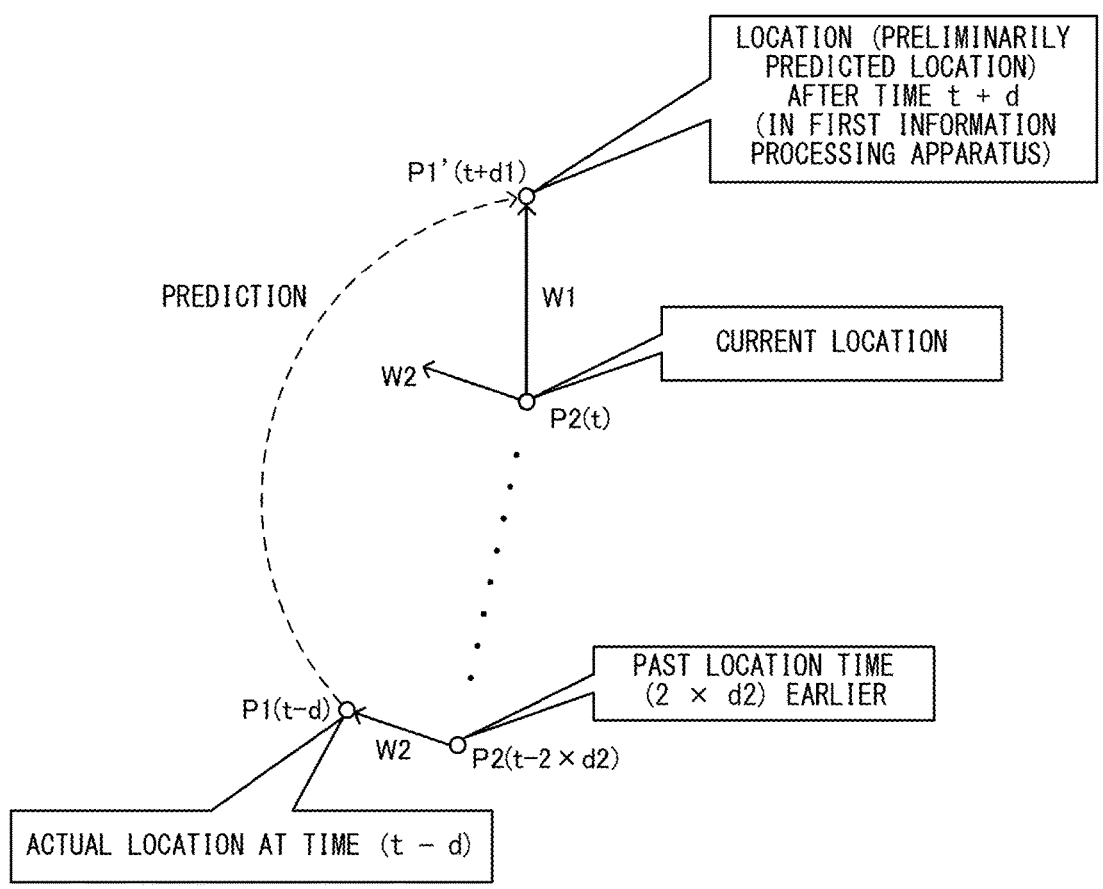
FIG. 13 is a diagram showing a non-limiting example technique of calculating a predicted position.

FIG. 13 is a diagram showing a non-limiting example technique of calculating a predicted position. In FIG. 13, a current position P2(t) is the current position of the hand of the first object 21, or in other words, a position obtained by the previous predicted position calculation process. A first correction vector W1 and a second correction vector W2 are each used to correct the current position P2(t). In this non-limiting example embodiment, the second information processing apparatus 2 uses the first correction vector W1 and the second correction vector W2 to correct the current position P2(t), and thereby calculates a new predicted position P2(t+1). Note that, in the description of FIG. 13, the position of the hand of the first object 21 in the first information processing apparatus 1 is represented by P1, and the position of the hand of the first object 21 in the second information processing apparatus 2 is represented by P2.

The first correction vector W1 is calculated on the basis of the current position P2(t) and a preliminarily predicted position P1'(t+d1). The preliminarily predicted position P1'(t+d1) is a position (in other words, a future position) that will be taken a first delay value d1 later than the current position in the first information processing apparatus 1. In this non-limiting example embodiment, the preliminarily predicted position P1'(t+d1) is not directly determined as a predicted position (in other words, the position of the hand in the second information processing apparatus 2), and a predicted position is calculated, taking another factor (e.g., the correction vector W2) into consideration. Therefore, the position P1'(t+d1) is referred to as a "preliminarily predicted position."

The first delay value d1 is calculated on the basis of the delay time d. In this non-limiting example embodiment, the first delay value d1 is obtained by multiplying the delay time d by a predetermined coefficient. The first delay value d1 indicates by how much time the preliminarily predicted position will be taken later from the current time. Here, if the first delay value d1 is extremely great, it is difficult to perform correct prediction, and therefore, the action of the hand performed on the basis of the predicted position is likely to be unnatural. Therefore, in this non-limiting example embodiment, an upper limit value is previously set for the first delay value d1. In other words, if the delay time d is extremely long, the first delay value d1 is set to the upper limit value.

The preliminarily predicted position P1'($t$+d1) is calculated by performing prediction on the basis of an actual position P1($t$−d) indicated by the object information received from the first information processing apparatus 1 (see FIG. 13). Here, the position of the hand indicated by the object information received from the first information processing apparatus 1 by the second information processing apparatus 2 at a time point t is a past position that was taken the delay time d earlier from the current time point t. In other words, the second information processing apparatus 2 receives the object information indicating a position that was taken the delay time d earlier, from the first information processing apparatus 1. Therefore, the actual position P1($t$−d) is the position of the hand in the first information processing apparatus 1 at a past time point that was taken the delay time d earlier from the current time point t, i.e., the actual position of the hand at the time point (t−d). In this non-limiting example embodiment, the preliminarily predicted position P1'($t$+d1) is calculated by predicting a position that will be taken a time (d+d1) later than the actual position P1($t$−d) of the hand.

Note that any suitable technique for calculating (in other words, predicting) a preliminarily predicted position may be used. For example, the second information processing apparatus 2 may calculate a preliminarily predicted position on the basis of the actual position P1($t$−d) of the hand and the velocity of the hand at the actual position (in other words, the velocity indicated by the object information). Specifically, a preliminarily predicted position may be calculated as a position obtained by moving the actual position of the hand in a direction corresponding to the direction of the velocity of the hand, by a distance corresponding to the velocity and the first delay value d1. For example, the second information processing apparatus 2 may calculate a preliminarily predicted position on the basis of the input information (i.e., information about an operational input with respect to the first object 21) contained in the game information received from the first information processing apparatus 1, in addition to the position and velocity of the hand. For example, when receiving the input information indicating an input to move the hand rightward during a punch action, the second information processing apparatus 2 may calculate, as a preliminarily predicted position, a position obtained by moving the actual position of the hand forward, gradually bending to the right, i.e. in a rightward curve. Alternatively, the second information processing apparatus 2 may calculate a preliminarily predicted position using an input value indicated by the input information, and in addition, the differential value and/or second-order differential value of the input value. Note that a commonly used technique may be used to predict a preliminarily predicted position.

Note that, in this non-limiting example embodiment, the second information processing apparatus 2 calculates the next position P2($t$+1) using a previously prepared position calculation function f on the basis of the current position P2($t$), etc. Although described in detail below, the position calculation function f takes the current position, etc., as an input, and outputs the next position (i.e., the position of the hand in the next frame). Here, the second information processing apparatus 2 may calculate a preliminarily predicted position using the position calculation function f Specifically, the second information processing apparatus 2 calculates a preliminarily predicted position by repeatedly executing a process of calculating the next position by inputting the current position, etc., into the position calculation function f, a number of times corresponding to the length of a prediction time (here, d+d1). Note that, in this case, the second information processing apparatus 2 uses the output (in other words, a predicted position) of the position calculation function f in the n-th execution of the above process (where n is an integer of one or more) as the input of the position calculation function f in the (n+1)th execution of the above process. Note that a position that is input in the first execution of the above process is the actual position P1($t$−d). Thereafter, by performing the above process (d+d1) times, the second information processing apparatus 2 can predict the position of the hand at the time (t+d1) (i.e., the preliminarily predicted position P1'($t$+d1)). Alternatively, when the input value indicated by the input information is used as an input to the position calculation function f, the second information processing apparatus 2 may change the input value to the position calculation function f on the basis of the differential value and/or second-order differential value of the input value, while the above process is executed a plurality of times.

As shown in FIG. 13, the first correction vector W1 is calculated as a vector having an initial point at the current position P2($t$) and a terminal point at the preliminarily predicted position P1'($t$+d1). Specifically, the correction vector W1 is used to correct the current position P2($t$) to the preliminarily predicted position P1'($t$+d1), i.e., to perform the correction to predict a position that will be taken the time d1 later from the current time point. Here, in this non-limiting example embodiment, as described above, it is intended that the second information processing apparatus 2 predicts a position that will be taken the delay time d later than the position of the hand at the current time point in the first information processing apparatus 1 (see FIG. 8). Therefore, the second information processing apparatus 2 calculates a preliminarily predicted position using the first correction vector W1 based on the first delay value d1 according to the delay time d.

As shown in FIG. 13, the second correction vector W2 is calculated on the basis of the actual position P1($t$−d) in the first information processing apparatus 1 and a past predicted position P2($t$−2× d2) in the second information processing apparatus 2. Although described in detail below, the second correction vector W2 indicates a difference between the actual position of the hand in the first information processing apparatus 1 and a predicted position that was calculated in the past in the second information processing apparatus 2. Specifically, the second correction vector W2 is used to correct the above difference related to a predicted position that was calculated in the past.

The past predicted position P2($t$−2×d2) was taken at a time earlier than the current time point t by double a second delay value d2. Note that, in this non-limiting example embodiment, the second information processing apparatus 2 stores predicted positions that are repeatedly calculated during the main action of the first object 21.

Note that the second delay value d2 is calculated on the basis of the delay time d. The second delay value d2 indicates by how much time the actual position P1($t$−d) is assumed to be taken earlier than the current position P2($t$). The second delay value d2 is obtained by multiplying the delay time d by a predetermined coefficient, and an upper limit value is set for the second delay value d2, like the first delay value d1. Although the second delay value d2 is thus calculated in a manner similar to that for the first delay value d1, the actual second delay value d2 may be different from the first delay value d1. Specifically, the coefficient for calculating the second delay value d2 and the upper limit value may be different from the coefficient for calculating the first delay value d1 and the upper limit value.

As described above, in this non-limiting example embodiment, it is intended that the second information processing apparatus 2 predicts a position that will be taken the delay time d later than the position of the hand at the current time point in the first information processing apparatus 1. Specifically, ideally, the current position P2($t$) is a predicted position that will be taken the delay time d later than the position of the hand at the current time point tin the first information processing apparatus 1, and corresponds to a position P(t+d) at time (t+d) in the first information processing apparatus 1. Therefore, in this non-limiting example embodiment, ideally, the second information processing apparatus 2 assumes that the difference between the current position P2($t$) that will be taken the delay time d later from the current time point and the actual position P1($t$–d) that was taken the delay time d earlier from the current time point is double the delay time d. Specifically, the second information processing apparatus 2 calculates the second correction vector W2 for correcting the difference using the actual position P1($t$–d) and the past predicted position P2($t$–2×d2).

Specifically, as shown in FIG. 13, the second correction vector W2 is calculated as a vector having an initial point at the past predicted position P2($t$–2×d2) and a terminal point at the actual position P1($t$–d). In other words, the second correction vector W2 is used to correct the current position P2($t$) so that the difference between the position of the hand in the first information processing apparatus 1 and the position of the hand in the second information processing apparatus 2, at the time point (t–d), is corrected.

Note that the value of (t–2×d2) may be negative immediately after the main action is started in the second information processing apparatus 2. In this case, the second information processing apparatus 2 sets the second correction vector W2 to zero. In this case, the correction using the second correction vector W2 is not performed.

As described above, the second information processing apparatus 2 corrects the current position P2($t$) using the correction vectors W1 and W2. Specifically, the second information processing apparatus 2 calculates a predicted position that will be taken the delay time d later using the first correction vector W1, and corrects the predicted position using the second correction vector W2 so that the current difference is corrected or reduced on the basis of the past difference. A specific technique of calculating a predicted position in this non-limiting example embodiment will now be described.

Initially, the second information processing apparatus 2 calculates the correction vectors W1 and W2, and then calculates a correction calculation vector W for performing correction using the correction vectors W1 and W2. The correction calculation vector W is a vector indicating a movement amount and a movement direction in which the previous predicted position is moved. The correction calculation vector W is obtained by combining the correction vectors W1 and W2, and specifically, is calculated by:

$$W = a \times W1 + b \times W2 \tag{1}$$

where the coefficients "a" and "b" each represent a predetermined constant. Note that, in this non-limiting example embodiment, an upper limit value is set for the magnitude of the correction calculation vector W obtained by expression (1). Specifically, if the magnitude of the correction calculation vector W is greater than the predetermined upper limit value, the second information processing apparatus 2 corrects the magnitude of the correction calculation vector W to the upper limit value. By setting the upper limit value, a sharp change in a predicted position can be prevented or reduced, and therefore, the possibility that the action of the hand based on a predicted position is unnatural can be reduced. Note that, in other non-limiting example embodiments, no upper limit value may be set for the correction calculation vector W.

In this non-limiting example embodiment, linear interpolation is performed on the correction calculation vector W. Specifically, the second information processing apparatus 2 calculates a correction calculation vector W(t) that is used in the predicted position calculation process at the time point t:

$$W(t) = c \times W + (1-c) \times W(t-1) \tag{2}$$

where the coefficient "c" is a predetermined constant. As indicated by expression (2), in this non-limiting example embodiment, the correction calculation vector W(t) is obtained by combining the correction calculation vector W(t–1) obtained by the previous predicted position calculation process, and the correction calculation vector W calculated by the current predicted position calculation process, at a predetermined ratio. As a result, a sharp change in the correction calculation vector can be prevented or reduced, and therefore, a sharp change in a predicted position can be prevented or reduced. Note that, in other non-limiting example embodiments, the second information processing apparatus 2 may use the correction calculation vector W obtained by expression (1) directly as the correction calculation vector W(t) that is used in the predicted position calculation process at the time point t.

As described above, in this non-limiting example embodiment, the correction calculation vector W(t) is calculated in order to calculate a predicted position of the hand of the first object 21. Here, in this non-limiting example embodiment, the second information processing apparatus 2 calculates a vector X(t) for correction calculation in order to calculate a predicted velocity V of the hand of the first object 21, like the position of the hand. Here, the predicted velocity V is a value in a three-dimensional space like the predicted position P2. Therefore, the second information processing apparatus 2 can calculate the vector X(t) for correction calculation related to the predicted velocity V like the correction calculation vector W(t) related to the predicted position P2. Note that the vector X(t) can calculated on the basis of expressions similar to expressions (1) and (2). Note that the coefficients "a," "b," and "c" in expressions (1) and (2) may be different between the calculation of the vector X(t) and the calculation of the vector W(t).

The second information processing apparatus 2 calculates a new predicted position P2($t$+1) on the basis of a value obtained by correcting the current position P2($t$) using the correction calculation vector W(t), and a value obtained by correcting the current velocity V(t) using the vector X(t) for correction calculation.

Here, the second information processing apparatus 2 uses a previously prepared position calculation function f{P2, V, . . . } in order to calculate the position of the hand in a punch action that is performed by the second object 22. Therefore, in this non-limiting example embodiment, the position calculation function f is also used to calculate a predicted position for the first object 21. Note that the position calculation function f{P2, V, . . . } takes at least the current position P2 and the current velocity V as inputs, and outputs a new position. Note that the position calculation function f may be similar to a commonly used function.

Specifically, the new predicted position P2(*t*+1) is calculated by:

$$P2(t+1)=f\{P2(t)+W(t),V(t)+X(t),\ldots\} \quad (3)$$

As can be seen from expression (3), the predicted position P2(*t*+1) for the first object 21 is obtained by inputting, into the position calculation function f, a position (P2(*t*)+W(t)) obtained by correcting the current position P2(*t*) using the correction calculation vector W(t), and a velocity (V(t)+X(t)) obtained by correcting the current velocity V(t) using the vector X(t). Thus, in this non-limiting example embodiment, a predicted position for the first object 21 can be calculated using a technique similar to that which is used to calculate the position of the hand in a punch action that is performed by the second object 22. Note that, in other non-limiting example embodiments, the second information processing apparatus 2 may calculate a predicted position for the first object 21 using a technique that does not employ the position calculation function f (i.e., a technique different from the technique of calculating the position of the hand in a punch action that is performed by the second object 22).

Note that, as can be seen from the foregoing, in this non-limiting example embodiment, the first correction vector W1 is not directly used to calculate a predicted position. Instead, the correction calculation vector W(t) is used. The correction calculation vector W(t) does not always correct the current position P2(*t*) to a position that will be taken the delay time later (i.e., the preliminarily predicted position P1'(*t*+d1)). Specifically, when the predicted position calculation process is executed once, the predicted position P2(*t*+1) is calculated as a position that is closer to the current position P2(*t*) than is the preliminarily predicted position. Note that, in this non-limiting example embodiment, the predicted position calculation process is repeatedly executed during the main action that is performed by the first object 21, and therefore, a predicted position is gradually advanced as the predicted position calculation process is repeatedly executed. Specifically, as shown in FIG. 9, for a while immediately after the start of the main action, a predicted position is not much advanced, and the position of the hand in the first information processing apparatus 1 is further advanced than the predicted position in the second information processing apparatus 2 (the portion (b) of FIG. 9). Meanwhile, after some time has passed since the start of the main action, a predicted position in the second information processing apparatus 2 is gradually advanced to go past the position of the hand in the first information processing apparatus 1, i.e., a predicted position in the second information processing apparatus 2 is further advanced than the position of the hand in the first information processing apparatus 1 (the portion (c) of FIG. 9).

As described above, in this non-limiting example embodiment, the second information processing apparatus 2 repeatedly executes the predicted position calculation process. In the predicted position calculation process, the second information processing apparatus 2 calculates a position (i.e., a preliminarily predicted position) that will be taken a predetermined time (d1) based on the delay time later, and calculates a new predicted position (P2(*t*+1)) on the basis of that calculated position and the previous predicted position (i.e., the current position P2(*t*)). Thus, the second information processing apparatus 2 calculates a preliminarily predicted position that is a position that will be taken a predetermined time based on the delay time later, and calculates a new predicted position on the basis of the preliminarily predicted position. Therefore, the second information processing apparatus 2 can accurately calculate a predicted position, taking the delay time into consideration.

The second information processing apparatus 2, when receiving new object information, calculates a new predicted position (P2(*t*+1)) on the basis of the difference (i.e., the second correction vector W2) between a position specified by the received object information (i.e., the actual position P1(*t*−d)) and a position that was predicted a predetermined time (2×d2) based on the delay time earlier (i.e., the past predicted position P2(*t*−2×d2)). Thus, the second information processing apparatus 2 can calculate a predicted position, taking into consideration the difference between a predicted position calculated by the second information processing apparatus 2 and an actual position in the first information processing apparatus 1, and therefore, can more correctly calculate a predicted position. Here, in this non-limiting example embodiment, a punch action can be controlled by an input after the action is started, and therefore, in some cases, it is difficult to predict a position after the start of the action. However, even in such a case, a predicted position can be more correctly calculated on the basis of the above difference.

In this non-limiting example embodiment, the second information processing apparatus 2 firstly predicts a preliminarily predicted position, and then corrects the preliminarily predicted position on the basis of the second correction vector W2, to calculate a predicted position. Specifically, the second information processing apparatus 2 corrects a preliminarily predicted position that is calculated on the basis of the first delay value (d1) based on the delay time, on the basis of the second delay value (d2) based on the delay time and a position (i.e., the actual position P1(*t*−d)) specified by the object information received from the first information processing apparatus 1, to obtain a new predicted position. As a result, a predicted position can be calculated, taking the delay time into consideration, and can be corrected on the basis of the second delay value and the object information, whereby a predicted position can be more correctly calculated.

Note that, in other non-limiting example embodiments, the predicted position may be calculated without using the second correction vector W2. Even when a predicted position is calculated without using the second correction vector W2, the first correction vector W1 can be used to cause the position of the hand of the first object 21 in the second information processing apparatus 2 to be further advanced than the position of the hand in the first information processing apparatus 1, as in this non-limiting example embodiment. As a result, the result display can be performed at a more appropriate timing in the first information processing apparatus 1.

(2-7. Control of Punch Action by Sender)

As described above, in this non-limiting example embodiment, a punch action in the second information processing apparatus 2 is controlled so that the punch action period in the second information processing apparatus 2 is shorter than the punch action period in the first information processing apparatus 1. Here, if the delay time is extremely long, the reduction in the punch action period in the second information processing apparatus 2 increases, and therefore, a punch action in the second information processing apparatus 2 is likely to be performed at an extremely high speed. In this case, the user of the second information processing apparatus 2 is likely to feel unnaturalness in the punch action, or it is likely to be extremely difficult for the user to play a game.

With this in mind, in this non-limiting example embodiment, if the delay time is extremely long, a punch action that is performed by the first object 21 in the first information processing apparatus 1 is slowed (i.e., the punch action period is elongated). As a result, the reduction in the punch action period in the second information processing apparatus 2 can be decreased, and therefore, unnaturalness that is experienced by the user of the second information processing apparatus 2 can be reduced. This will now be described in greater detail with reference to FIG. 14.

Figure 14:
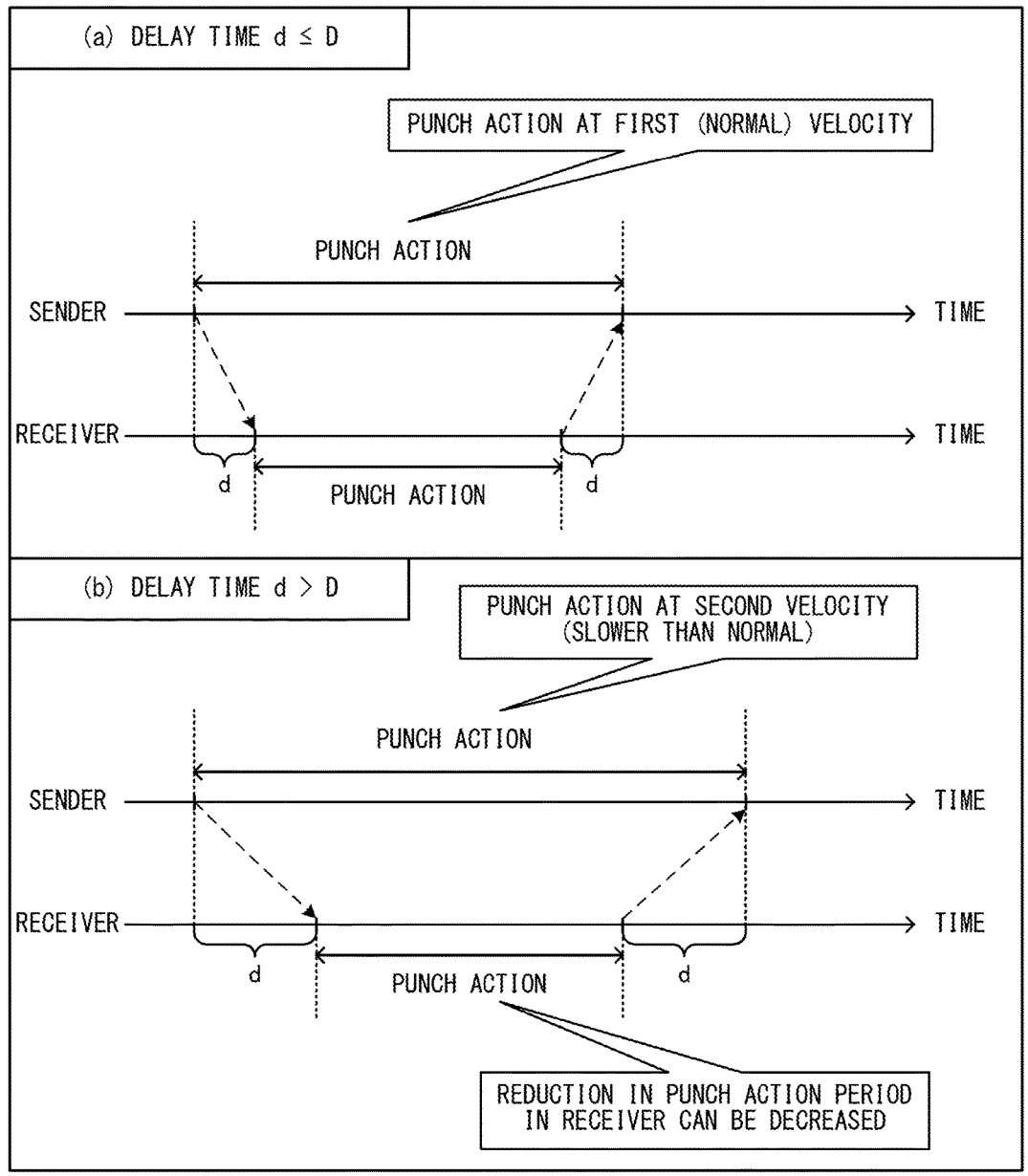
FIG. 14 is a diagram showing a non-limiting example of punch action periods in a sender and a receiver.

FIG. 14 is a diagram showing a non-limiting example of punch action periods in a sender and a receiver. A portion (a) of FIG. 14 shows a punch action period in a case where the delay time d is short (i.e., the delay time d is a reference time D or less). A portion (b) of FIG. 14 shows a punch action period in a case where the delay time d is long (i.e., the delay time d is longer than the reference time D).

As shown in the portion (a) of FIG. 14, when the delay time d is the reference time D or less, the first information processing apparatus 1 causes the first object 21 to perform a punch action at a predetermined first velocity (in other words, a normal velocity). In contrast to this, as shown in the portion (b) of FIG. 14, when the delay time d is longer than the reference time D, the first information processing apparatus 1 causes the first object 21 to perform a punch action at a second velocity that is smaller than the first velocity. As a result, the punch action period in the first information processing apparatus 1 in the case where the delay time d is longer than the reference time D, is longer than the punch action period in the first information processing apparatus 1 in the case where the delay time d is the reference time D or less (see FIG. 14). Therefore, according to this non-limiting example embodiment, when the delay time d is longer than the reference time D, the reduction in the punch action period in the second information processing apparatus 2 can be decreased. For example, in the non-limiting example of FIG. 14, the punch action period in the second information processing apparatus 2 can be substantially the same between the case shown in the portion (a) of FIG. 14(a) and the case shown in the portion (b) of FIG. 14.

3. Specific Non-Limiting Example of Game Process

A specific non-limiting example case where the game process outlined above is executed in the information processing system will be described with reference to FIGS. 15-20. Note that, in the description with reference to FIGS. 15-20, it is, for example, assumed that the first information processing apparatus 1 is a sender (i.e., the first object 21 performs a punch action in the first information processing apparatus 1, and the result information about the punch action is sent to the second information processing apparatus 2), like the description with reference to FIGS. 3-14. Note that a process that is performed when the second information processing apparatus 2 is a sender is similar to a process that is performed when the first information processing apparatus 1 is a sender, and these two processes may be executed serially or in parallel.

(3-1. Data)

Figure 15:
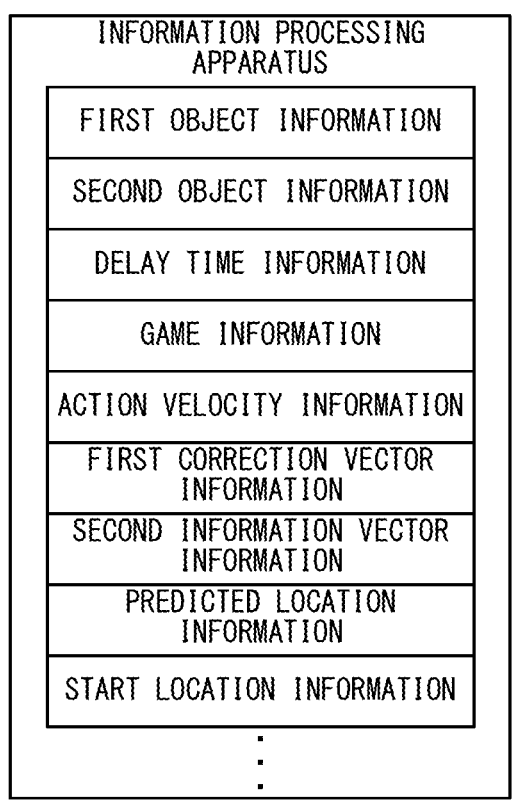
FIG. 15 is a diagram showing non-limiting example information that is used in a game process executed in an information processing apparatus.

A specific non-limiting example data that is used in the game process executed in the information processing system will be described with reference to FIG. 15. FIG. 15 is a diagram showing non-limiting example information that is used in the game process executed in an information processing apparatus. The information (in other words, data) shown in FIG. 15 is stored in a storage device (specifically, a memory in the processing unit 11 and/or the storage unit 12) in the information processing apparatus.

The information processing apparatus stores first object information and second object information. The first object information is about the first object 21. The second object information is about the second object 22. Note that the first information processing apparatus 1 that is a sender generates the first object information according to an input to the input unit 13, and obtains the object information contained in the game information received from the second information processing apparatus 2 as the second object information.

The information processing apparatus stores delay time information. The delay time information indicates a delay time related to communication with another information processing apparatus. Note that, in this non-limiting example embodiment, the information processing apparatuses 1 and 2 each perform a process of specifying the delay time (step S12 or S32 described below) to obtain the delay time information.

Figure 16:
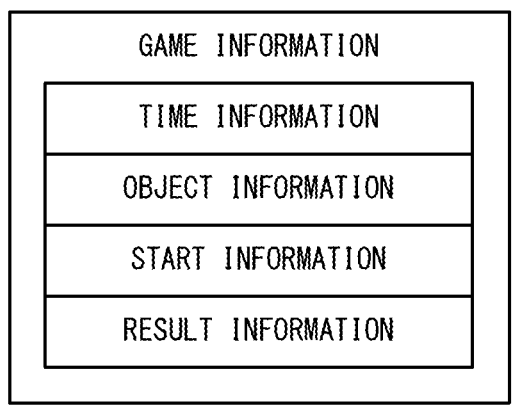
FIG. 16 is a diagram showing non-limiting example information contained in game information.

The information processing apparatus stores game information. The game information is about a game. The information processing apparatus sends the game information to another information processing apparatus with which that information processing apparatus communicates. FIG. 16 is a diagram showing non-limiting example information contained in the game information. As shown in FIG. 16, in this non-limiting example embodiment, the game information contains time information, and the above-described object information, start information, and result information. The time information indicates a time at which the game information is sent. In this non-limiting example embodiment, the game information is generated to unavoidably contain the time information and the object information. In contrast to this, the start information and the result information are contained in the game information if a predetermined condition is satisfied (step S14 or S67 described below). Otherwise, none of the start information and the result information is contained in the game information.

As shown in FIG. 15, the information processing apparatus stores action velocity information. The action velocity information indicates a velocity at which a punch action is to be performed, and in this non-limiting example embodiment, indicates the first velocity or the second velocity. The action velocity information is stored in an information processing apparatus that is a sender. The information processing apparatus that is a sender causes an object to be controlled to perform a punch action at a velocity indicated by the action velocity information.

The information processing apparatus that is a receiver stores first correction vector information, second correction vector information, predicted position information, and start position information. The first correction vector information indicates the first correction vector. The second correction vector information indicates the second correction vector. The predicted position information indicates the predicted position. Note that the information processing apparatus stores predicted positions calculated during a single punch action as a predicted position history. The start position information indicates the punch start position.

(3-2. Process in Information Processing Apparatus as Sender)

Figure 17:
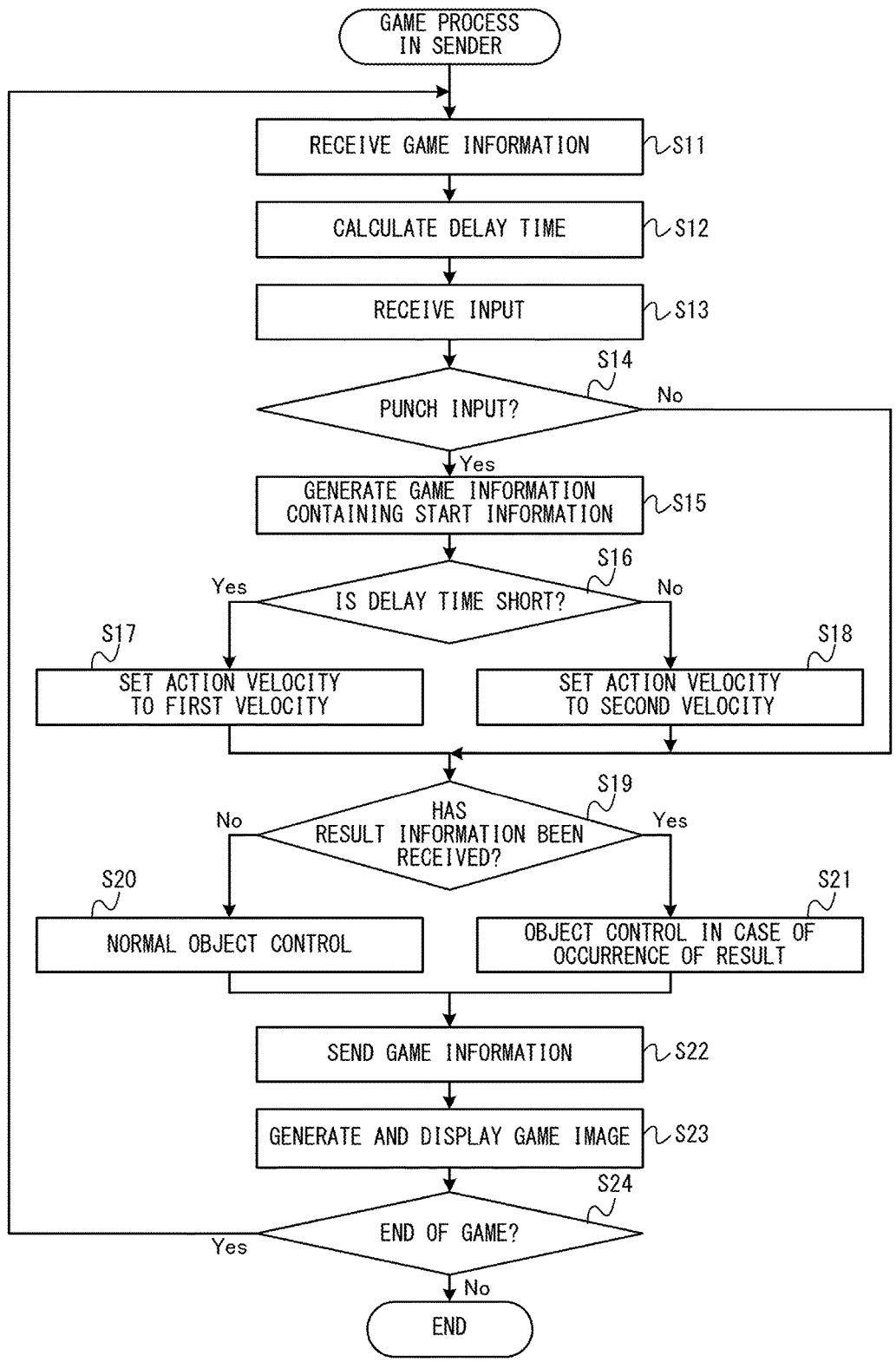
FIG. 17 is a flowchart showing a non-limiting example flow of a game process executed by an information processing apparatus that is a sender.

FIG. 17 is a flowchart showing a non-limiting example flow of a game process (referred to as a "sender game process") executed by an information processing apparatus that is a sender (here, the first information processing apparatus 1). Note that a series of steps shown in FIG. 17 is started in response to the start of a game after a game program stored in the storage unit 12 is started.

Note that, in this non-limiting example embodiment, it is assumed that the steps of FIG. 17 (or FIGS. 18-20 described below) are executed by a CPU (in other words, a processor) in a processing unit of the information processing apparatus executing a game program stored in the storage unit 12. Note that, in other non-limiting example embodiments, a portion of the steps may be executed by a processor (e.g., a dedicated circuit, etc.) other than the CPU. The steps shown in FIGS. 17-20 are merely for illustrative purposes. If a similar effect is achieved, the order in which the steps are performed may be changed, or another step may be performed in addition to (or instead of) each step.

The processing unit of the information processing apparatus executes the steps of FIGS. 17-20 using a memory. Specifically, the CPU of the processing unit stores information (in other words, data) obtained by each step into the memory, and when that information is used in the following steps, reads and uses that information from the memory.

In step S11 shown in FIG. 17, the processing unit 11 receives the game information sent from the second information processing apparatus 2. Specifically, the processing unit 11 obtains the game information from the second information processing apparatus 2 through the communication unit 15. Following step S11, step S12 is executed.

In step S12, the processing unit 11 calculates the delay time between the first information processing apparatus 1 and the second information processing apparatus 2. Any suitable technique of calculating the delay time may be used. A commonly used calculation technique may be used. For example, the processing unit 11 calculates the delay time on the basis of the time information contained in the game information received in step S11. Specifically, the processing unit 11 calculates the delay time on the basis of the difference between a time indicated by the time information and the current time. In this case, the delay time information indicating the calculated delay time is stored into the storage unit 12. Following step S12, step S13 is executed.

Note that the game information fails to be received in step S11 in some communication conditions between the first information processing apparatus 1 and the second information processing apparatus 2. In this case, the processing unit 11 does not execute step S12, and executes step S13 and following steps using the most recently calculated delay time.

In step S13, the processing unit 11 receives an input to the input unit 13. Specifically, the processing unit 11 obtains information indicating an input to the input unit 13, and stores the information into the memory. Following step S13, step S14 is executed.

In step S14, on the basis of the information obtained in step S13, the processing unit 11 determines whether or not a punch input has been performed with respect to the input unit 13. If the determination result in step S14 is positive, step S15 is executed. Meanwhile, if the determination result in step S14 is negative, steps S15-S18 are skipped, and step S19 described below is executed.

In step S15, the processing unit 11 generates the game information containing the start information. As a result, in step S22 described below, the game information containing the start information is sent to the second information processing apparatus 2. Following step S15, step S16 is executed.

In step S16, the processing unit 11 determines whether or not the delay time at the current time point (i.e., a time point at which a punch input is performed) is short. Specifically, the processing unit 11 determines whether or not the delay time calculated in step S15 is shorter than or equal to the reference time D previously stored in the storage unit 12. If the determination result in step S16 is positive, step S17 is executed. Meanwhile, if the determination result in step S16 is negative, step S18 is executed.

In step S17, the processing unit 11 sets the velocity of a punch action that is performed by the first object 21 to the first velocity. Specifically, the processing unit 11 stores the action velocity information indicating the first velocity into the storage unit 12. As a result, in step S20 or S21 described below, the punch action that is performed by the first object 21 is controlled according to the first action velocity indicated by the action velocity information. Following step S17, step S19 is executed.

Meanwhile, in step S18, the processing unit 11 sets the velocity of a punch action that is performed by the first object 21 to the second velocity. Specifically, the processing unit 11 stores the action velocity information indicating the second velocity into the storage unit 12. As a result, in step S20 or S21 described below, the punch action that is performed by the first object 21 is controlled according to the second action velocity indicated by the action velocity information. Following step S18, step S19 is executed.

In step S19, the processing unit 11 determines whether or not the result information has been received from the second information processing apparatus 2. Specifically, the processing unit 11 determines whether or not the game information received in step S11 contains the result information. If the determination result in step S19 is positive, step S20 is executed. Meanwhile, if the determination result in step S19 is negative, step S21 is executed.

In step S20, the processing unit 11 controls the action of an object in a normal case (i.e., a case where a result of a punch action has not occurred). Specifically, the processing unit 11 controls the action of the first object 21 on the basis of the input received in step S1. The processing unit 11 also controls the action of the second object 22 on the basis of the object information contained in the game information received in step S4. In step S20, the first object information and the second object information that indicate states (the position and the velocity, etc.) of the objects 21 and 22, respectively, whose actions have been controlled, are stored into the storage unit 12. Following step S20, step S22 is executed.

In step S21, the processing unit 11 controls the action of an object in a case where a result of the punch action has occurred. Specifically, the processing unit 11 controls the action of the first object 21 according to the input received in step S1. The processing unit 11 also controls the action of the second object 22 on the basis of the result information contained in the game information received in step S4. Specifically, the processing unit 11 causes the second object 22 to perform the above reaction. Note that when the reaction is performed over a plurality of frames, the processing unit 11 executes step S21 instead of step S20 until the reaction ends. In step S21, the first object information and the second object information that indicate states (the position and the velocity, etc.) of the objects 21 and 22, respectively, whose actions have been controlled, are stored into the storage unit 12. Following step S21, step S22 is executed.

In step S22, the processing unit 11 sends the game information to the second information processing apparatus 2 using the communication unit 15 (in other words, through the communication unit 15). The game information contains the object information about the first object 21 whose action has been controlled in step S20 or S21. Following step S21, step S22 is executed.

In step S23, the processing unit 11 generates and displays a game image on the display unit 14. The processing unit 11 generates a game image representing a game space after the action has been controlled in step S20 or S21, on the basis of the first and second object information stored in the storage unit 12, and displays the generated game image on the display unit 14. Note that when a result of the punch action has occurred (i.e., step S21 is executed), the processing unit 11 displays an effect image representing the result in addition to the image representing the game space. Following step S23, step S24 is executed.

In step S24, the processing unit 11 determines whether or not to end the game. The processing unit 11 determines to end the game, for example, if a predetermined end condition (e.g., the physical strength of one of the objects is zero), or if an input indicating an instruction to end is input by a user). If the determination result in step S24 is negative, step S1 is executed again. The processing unit 11 repeatedly executes a loop of steps S1-S24 until the processing unit 11 determines to end in step S24. Meanwhile, if the determination result in step S24 is positive, the processing unit 11 ends the sender game process of FIG. 17.

(3-3. Process in Information Processing Apparatus as Receiver)

Figure 18:
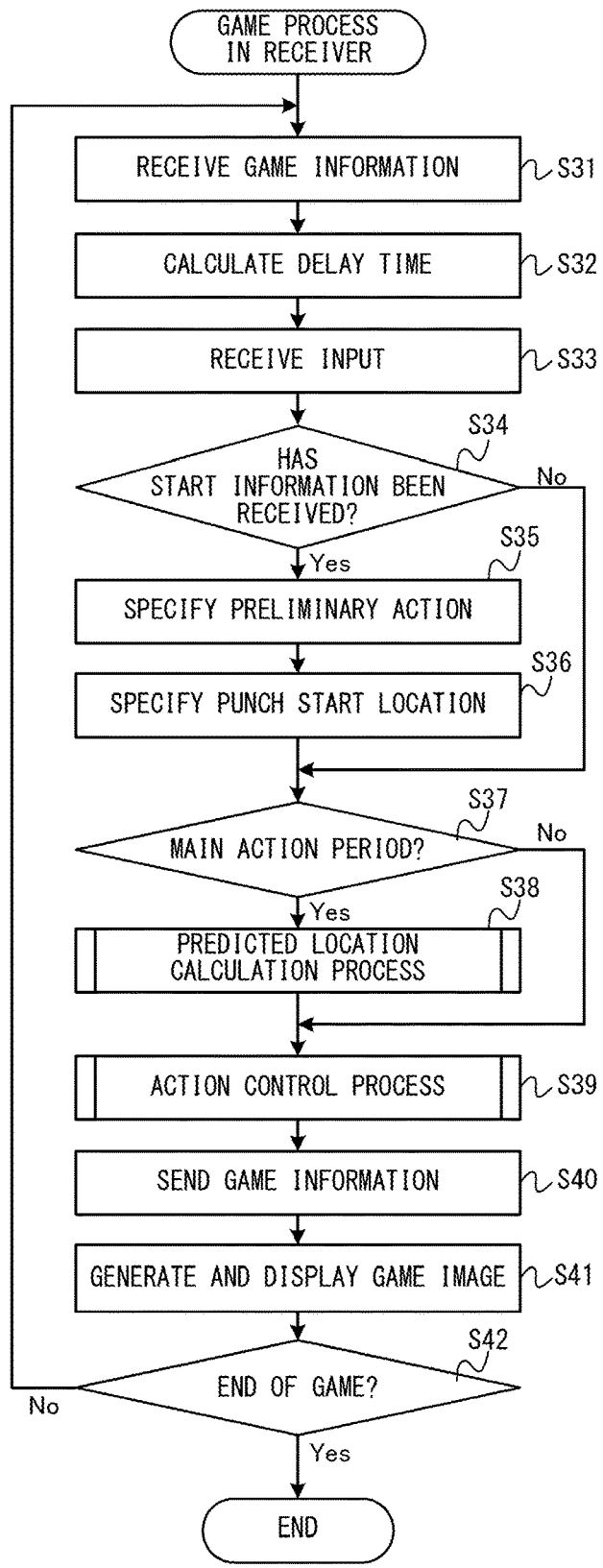
FIG. 18 is a flowchart showing a non-limiting example flow of a game process executed by an information processing apparatus that is a receiver.
Figure 19:
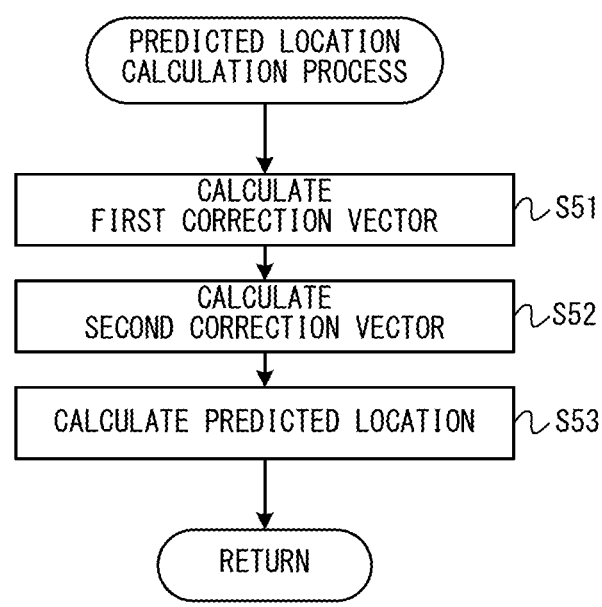
FIG. 19 is a sub-flowchart showing a non-limiting example detailed flow of a predicted position calculation process in step S38 shown in FIG. 18.
Figure 20:
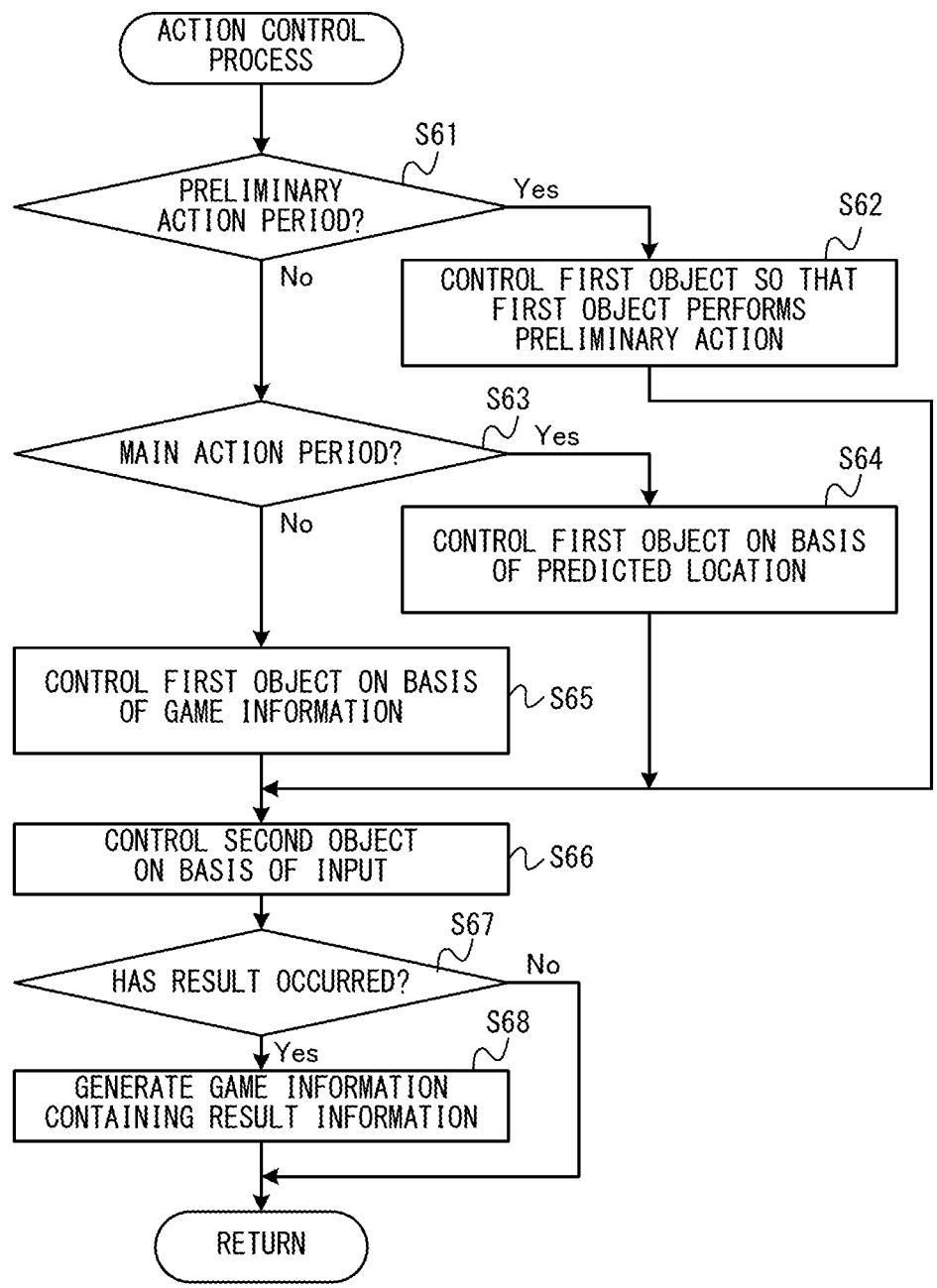
FIG. 20 is a sub-flowchart showing a non-limiting example detailed flow of an action control process in step S39 shown in FIG. 18.

FIGS. 18-20 are flowcharts showing a non-limiting example flow of a game process (referred to as a "receiver game process") that is executed by an information processing apparatus that is a receiver (here, the second information processing apparatus 2). Note that a series of steps shown in FIGS. 18-20 is started in response to the start of a game after a game program stored in a storage unit of the second information processing apparatus 2 (hereinafter simply referred to as the "storage unit" in the description with reference to FIGS. 18-20).

In step S31 shown in FIG. 18, a processing unit of the second information processing apparatus 2 (hereinafter simply referred to as the "processing unit" in the description with reference to FIGS. 18-20) receives the game information sent from the first information processing apparatus 1. Step S31 is similar to step S11. Following step S31, step S32 is executed.

In step S32, the processing unit calculates the delay time between the first information processing apparatus 1 and the second information processing apparatus 2. Step S32 is similar to step S12. Following step S32, step S33 is executed.

In step S33, the processing unit receives an input to an input unit of the second information processing apparatus 2. Step S33 is similar to step S13. Following step S33, step S34 is executed.

In step S34, the processing unit determines whether or not the start information has been received from the first information processing apparatus 1. Specifically, the processing unit determines whether or not the game information received in step S31 contains the start information. If the determination result in step S34 is positive, step S35 is executed. Meanwhile, if the determination result in step S34 is negative, step S35 is skipped, and step S36 described below is executed.

In step S35, the processing unit specifies a range of the preliminary action of a punch action that is performed by the first object 21. Specifically, the processing unit determines whether at least a portion of the preliminary action is to be performed or the entire preliminary action is to be skipped, using the technique described above in (2-4. Skipping of Preliminary Action). If at least a portion of the preliminary action is to be performed, the processing unit specifies a period of time during which the preliminary action is to be performed (in other words, by how much time the preliminary action is reduced). Following step S35, step S36 is executed.

In step S36, the processing unit specifies the punch start position in the punch action that is performed by the first object 21 using the technique described above in (2-5. Specification of Punch Start Position). In this case, the start position information indicating the specified punch start position is stored into the storage unit. Following step S36, step S37 is executed.

In step S37, the processing unit determines whether or not the current time is within a period of time during which the main action of the first object 21 is performed. The determination in step S37 may be performed by determining whether or not the current time point is within a period of time during which the first object 21 performs a punch action and is not within a period of time during which the preliminary action is performed. Here, the processing unit can specify the period of time during which the first object 21 performs a punch action as a period of time between the time of the reception of the start information from the first information processing apparatus 1 and the time of the sending of the result information to the first information processing apparatus 1. The processing unit can also specify the period of time during which the preliminary action is performed, on the basis of step S35. If the determination result in step S37 is positive, step S38 is executed. Meanwhile, if the determination result in step S37 is negative, step S38 is skipped, and step S39 described below is executed.

In step S38, the processing unit executes the predicted position calculation process. The predicted position calculation process will now be described in detail with reference to FIG. 19.

FIG. 19 is a sub-flowchart showing a non-limiting example detailed flow of the predicted position calculation process in step S38 shown in FIG. 18. In the predicted position calculation process, initially, in step S51, the processing unit calculates the first correction vector using the technique described above in (2-6. Method for Calculating Predicted Position). Note that when the predicted position calculation process is executed for the first time during a single main action that is performed by the first object 21, the punch start position calculated in step S36 is used as the current position. Therefore, when the preliminary action is skipped, the action (i.e., the main action) after the skipping is started from a situation where the hand is placed at the punch start position. In step S51, the first correction vector information indicating the calculated first correction vector is stored into the storage unit. Following step S51, step S52 is executed.

In step S52, the processing unit calculates the second correction vector using the technique described above in (2-6. Method for Calculating Predicted Position). In this case, the second correction vector information indicating the calculated second correction vector is stored into the storage unit. Following step S52, step S53 is executed.

In step S53, the processing unit calculates a predicted position on the basis of the first correction vector and the second correction vector using the technique described above in (2-6. Method for Calculating Predicted Position). In this case, the predicted position information indicating the calculated predicted position is stored into the storage unit. Following step S53, the processing unit ends the predicted position calculation process.

Referring back to FIG. 18, following the predicted position calculation process in step S38, step S39 is executed. In step S39, the processing unit executes an action control process. The action control process is to control the actions of the first object 21 and the second object 22. The action control process will now be described in detail with reference to FIG. 20.

FIG. 20 is a sub-flowchart showing a non-limiting example detailed flow of the action control process in step S39 shown in FIG. 18. In the action control process, initially, in step S61, the processing unit determines whether or not the current time is within a period of time during which the first object 21 performs the preliminary action. The determination in step S61 can be performed by determining whether or not the current time point is within a period of time during which the first object 21 performs a punch action and is within a period of time during which the preliminary action is performed. If the determination result in step S61 is positive, step S62 is executed. Meanwhile, if the determination result in step S61 is negative, step S63 described below is executed.

In step S62, the processing unit controls the first object 21 so that the first object 21 performs the preliminary action of the punch action. Note that the action control related to the preliminary action in step S62 is performed according to the action range specified in step S35. The processing unit also causes the first object 21 to perform another action in addition to the punch action, if necessary, on the basis of the object information contained in the game information received from the first information processing apparatus 1. Following step S62, step S66 described below is executed.

In step S63, the processing unit determines whether or not the current time is within a period of time during which the first object 21 performs the main action. The determination in step S63 is the same as the determination in step S37. If the determination result in step S63 is positive, step S64 is executed. Meanwhile, if the determination result in step S63 is negative, step S65 described below is executed.

In step S64, the processing unit controls the first object 21 so that the first object 21 performs the main action of the punch action. Specifically, the processing unit causes the first object 21 to perform the punch action on the basis of the predicted position information stored in the storage unit. In this case, the first object 21 is controlled so that the hand is placed at a predicted position. The processing unit also causes the first object 21 to perform another action in addition to the punch action, if necessary, on the basis of the object information contained in the game information received from the first information processing apparatus 1. Following step S64, step S66 described below is executed.

In step S65, the processing unit controls the action of the first object 21 on the basis of the object information contained in the game information received from the first information processing apparatus 1. In this case, the first object 21 performs another action in addition to the punch action. Following step S65, step S66 is executed.

Note that, in step S62, S64, or S65, the first object information indicating a state of the first object 21 whose action has been controlled is stored into the storage unit.

In step S66, the processing unit controls the action of the second object 22 according to the input received in step S33. In this case, the second object information indicating a state of the second object 22 whose action has been controlled is stored into the storage unit. Following step S66, step S67 is executed.

In step S67, the processing unit determines whether or not a result of the punch action performed by the first object 21 has occurred. Specifically, the processing unit executes the hit determination process with respect to the second object 22 against the punch action performed by the first object 21, to determine whether or not the hand of the first object 21 has hit the second object 22. If the determination result in step S67 is positive, step S68 is executed. Meanwhile, if the determination result in step S67 is negative, step S68 is skipped, and the processing unit ends the action control process.

In step S68, the processing unit generates the game information containing the result information. Note that if the second object 22 does not perform a guard action at the current time point (i.e., a time point at which the hand of the first object 21 hits the second object 22), the processing unit generates the game information containing the result information indicating that the punch has hit. If the second object 22 performs a guard action at the current time point, the processing unit generates the game information containing the result information indicating that the punch has been blocked. The game information containing the result information that has been generated in step S68 is sent to the first information processing apparatus 1 in step S40 described below. After step S68, the processing unit ends the action control process.

Referring back to FIG. 18, following the action control process in step S39, step S40 is executed. In step S40, the processing unit sends the game information to the first information processing apparatus 1 using a communication unit of the second information processing apparatus 2. The game information contains the object information about the second object 22 whose action has been controlled in step S39. Following step S40, step S41 is executed.

In step S41, the processing unit generates and displays a game image on a display unit of the second information processing apparatus 2. The processing unit generates a game image representing a game space in which the action has been controlled in step S37, on the basis of the first and second object information stored in the storage unit, and displays the generated game image on the display unit. Note that when a result of the punch action has occurred (i.e., step S68 has been executed), the processing unit displays an effect image representing the result in addition to the image representing the game space. Following step S41, step S42 is executed.

In step S42, the processing unit 11 determines whether or not to end the game. Step S42 is similar to step S24. If the determination result in step S42 is negative, step S31 is executed again. The processing unit repeatedly executes a loop of steps S31-S42 until the processing unit has determined to end the game in step S42. Meanwhile, if the determination result in step S42 is positive, the processing unit ends the receiver game process of FIG. 18.

4. Advantageous Effects and Variations of this Non-Limiting Example Embodiment

According to the above non-limiting example embodiment, the first information processing apparatus 1 has the following features:

a first control means (steps S20 and S21) that controls the first object 21 provided in a virtual space according to the user's input related to the first information processing apparatus 1; and a first sending means (step S22) that sends the object information about the first object 21 to the second information processing apparatus 2.

The second information processing apparatus 2 has the following features:

a first reception means (step S31) that receives the object information from the first information processing apparatus 1;

a prediction means (step S38) that calculates a predicted position that will be taken later than the current position of the first object 21 in the first information processing apparatus 1, on the basis of the received object information, and the delay time in communication between the first information processing apparatus 1 and the second information processing apparatus 2;

a processing means (step S39 and/or S67) that executes a predetermined game process (e.g., the process of controlling the action of an object, and/or the process of determining whether or not a result of a punch action has occurred) on the basis of a predicted position; and a second sending means (steps S40 and S68) that sends the result information indicating a result of a predetermined game process to the first information processing apparatus 1.

The "delay time in communication between the first information processing apparatus 1 and the second information processing apparatus 2" may be a delay time that occurs when information is sent from the first information processing apparatus 1 to the second information processing apparatus 2, or a delay time that occurs when information is sent from the second information processing apparatus 2 to the first information processing apparatus 1, or a delay time calculated on the basis of these delay times.

According to the above non-limiting example embodiment, the first information processing apparatus 1 has the above first control means and first sending means, and the second information processing apparatus 2 has the following features:

a reception means (step S31) that receives the object information from the first information processing apparatus 1;

a second control means (step S39) that controls the second object 22 provided in the virtual space according to the user's input to the second information processing apparatus 2, and controls the first object 21 on the basis of the object information; and a display control means (step S41) that causes a display device to display an image containing at least the first object 21.

The second control means skips a portion of an action (i.e., a punch action) that is performed by the first object 21 on the basis of the object information, if a predetermined condition is satisfied (step S35).

The predetermined condition is, for example, that the reception means has received information indicating that the first object 21 has started a predetermined action (e.g., a punch action) according to an input to the first information processing apparatus 1.

The above term "skip" means that at least a portion of an action that is performed by the first object 21 in the first information processing apparatus 1 is not performed as an action of the first object 21 in the second information processing apparatus 2. For example, in the first information processing apparatus 1, when the predetermined action is displayed by playing back an animation containing a predetermined number of images, and at least one of the images is not displayed in the second information processing apparatus 2 during the playback of the animation, it can be said that an action corresponding to the image(s) that is not displayed is skipped.

(Variations Related to Content of Game)

In other non-limiting example embodiments, a game that is executed in the information processing system may have any content. For example, in other non-limiting example embodiments, a game in which a player character or a player's avatar that is controlled by a user performs shooting may be executed. In this case, a receiver information processing apparatus can calculate a predicted position of a bullet object fired by a character corresponding to a sender information processing apparatus, to cause an action duration (i.e., a period of time between when the bullet object is fired and when the bullet object hits a character corresponding to the receiver information processing apparatus) of the bullet object to be shorter than that in the sender.

Note that the action whose action duration is to be shortened in a receiver information processing apparatus may be any suitable action that it takes some time to perform, such as a punch action in the above non-limiting example embodiment, the above shooting action, etc. For example, the above action to be processed may be a character's action to swing a sword object. In this case, a receiver information processing apparatus may calculate a predicted position of the sword object to cause the action duration of the sword object to be shorter than that in the sender.

Note that the action whose action duration is to be shortened in a receiver information processing apparatus may be an action that can be controlled by an input after the action is started, such as the punch action in the above non-limiting example embodiment, or may be an action that is not controlled by an input after the action is started.

(Variation Related to Communication Between Information Processing Apparatuses)

Note that the information processing apparatuses may communicate with each other using any suitable communication technique. For example, in other non-limiting example embodiments, the information processing apparatuses 1 and 2 may not communicate with each other through the network 3, and for example, may directly communicate with each other through short-range wireless communication. Alternatively, for example, the information processing apparatuses 1 and 2 may communicate with each other through a server. The information processing apparatuses may have both the function of communicating with each other through the network 3 and the function of communicating with each other through short-range wireless communication.

In other non-limiting example embodiments, the information processing system includes three or more information processing apparatuses. In this case, the information processing apparatus may communicate with each other through a peer-to-peer network, or alternatively, one sender information processing apparatus may send the game information to a plurality of receiver information processing apparatuses. In either case, the process in the above non-limiting example embodiment is applicable, and therefore, effects similar to those of the above non-limiting example embodiment can be achieved.

(Variation Related to Entity Executing Information Process)

In other non-limiting example embodiments, a portion of the process executed by a sender information processing apparatus in the above non-limiting example embodiment may be executed by a receiver information processing apparatus. In addition, a portion of the process executed by a receiver information processing apparatus in the above non-limiting example embodiment may be executed by a sender information processing apparatus. For example, the process of calculating the delay time may be executed by one of the information processing apparatuses 1 and 2, and in this case, the other apparatus may obtain information about the delay time from that apparatus.

In other non-limiting example embodiments, when the information processing apparatuses 1 and 2 can communicate with a server, each of the information processing apparatuses 1 and 2 may execute a process in corporation with the server. Specifically, a portion (e.g., the process of calculating the delay time) of the steps shown in FIGS. 17-20 may be executed by the server.

The above non-limiting example embodiment may be applied to, for example, a game system, a game apparatus, a game program, etc., in order to facilitate the synchronization of the actions of objects between information processing apparatuses.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising:
    a first information processing apparatus; and
    a second information processing apparatus configured to communicate with the first information processing apparatus,
    wherein the first information processing apparatus includes at least one processor and a first transceiver, the at least one processor of the first information processing apparatus being configured to at least:
        execute a first game display process related to an action according to an input by a user of the first information processing apparatus, the action continuing during a first period;
        send game information about the action to the second information processing apparatus using the first transceiver, and
    wherein the second information processing apparatus includes at least one processor and a second transceiver, the at least one processor of the second information processing apparatus being configured to at least:
        receive the game information about the action from the first information processing apparatus through the second transceiver,
        execute a second game display process related to the action that is taken later than a start of the first game display process related to the action in the first information processing apparatus, based on the received game information, the action continuing during a second period that is shorter than the first period; and
        send result information indicating a result of the second game display process to the first information processing apparatus using the second transceiver.

2. The information processing system according to claim 1, wherein the at least one processor of the second information processing apparatus is further configured to at least:
    repeatedly calculate a predicted position associated with the action, and
    in the repeated calculation of the predicted position, calculate a position that is taken at a later time based on a delay time in communication between the first and second information processing apparatuses, and calculate a new predicted position associated with the action based on the calculated position and a previous predicted position associated with the action.

3. The information processing system according to claim 1, wherein the at least one processor of the second information processing apparatus is further configured to at least:
    repeatedly calculate a predicted position associated with the action, and
    when newly receiving the game information, calculate a new predicted position associated with the action based on a difference between a position specified by the received game information and a position that is predicted at an earlier time based on a delay time in communication between the first and second information processing apparatuses.

4. The information processing system according to claim 1, wherein the at least one processor of the second information processing apparatus is further configured to at least:
    repeatedly calculate a predicted position associated with the action, and
    obtain a new predicted position associated with the action by correcting a predicted position calculated based on a first value based on a delay time in communication between the first and second information processing apparatuses, based on a second value based on the delay time, and a position specified by the received game information.

5. The information processing system according to claim 1, wherein the at least one processor of the second information processing apparatus is further configured to at least:
    repeatedly calculate a predicted position associated with the action,
    in the repeated calculation of the predicted position, calculate a new predicted position associated with the action by calculating a movement amount based on a delay time in communication between the first and second information processing apparatuses, and moving a previous predicted position based on the calculated movement amount, and
    calculate another new predicted position associated with the action using another movement amount obtained by combining a movement amount in a previous calculation of the predicted position, and a movement amount calculated in a current calculation of the predicted position, at a predetermined ratio.

6. The information processing system according to claim 1, wherein:
    the at least one processor of the second information processing apparatus is further configured to at least control the action in the second information processing apparatus based on a predicted position so that a time taken to complete the action in the second information processing apparatus is shorter than a time taken to complete the action in the first information processing apparatus.

7. The information processing system according to claim 6, wherein the at least one processor of the second information processing apparatus is further configured to at least cause the action to be generated while skipping a portion of the action.

8. The information processing system according to claim 1, wherein:
the at least one processor of the first information processing apparatus is further configured to at least cause a second action according to the input,
when a result occurs due to the second action in the second information processing apparatus, the at least one processor of the second information processing apparatus is further configured to at least send the result information to the first information processing apparatus using the second transceiver,
the at least one processor of the first information processing apparatus is further configured to at least receive the result information from the second information processing apparatus through the first transceiver, and
the at least one processor of the first information processing apparatus is further configured to at least generate for display, on a display, an image representing a result of the first game display process based on the received result information.

9. The information processing system according to claim 8, wherein the at least one processor of the second information processing apparatus is further configured to at least further control a third action according to an input by a user of the second information processing apparatus,
the at least one processor of the second information processing apparatus is further configured to at least determine, in the second game display process, whether the third action has been affected by the second action, and
the at least one processor of the second information processing apparatus is further configured to at least send information indicating whether the second action has been affected by the third action, as the result information, to the first information processing apparatus using the second transceiver.

10. The information processing system according to claim 1, wherein the at least one processor of the first information processing apparatus is further configured to at least send the game information containing information indicating the input by the user of the first information processing apparatus, to the second information apparatus using the first transceiver.

11. The information processing system according to claim 1, wherein the at least one processor of the second information processing apparatus is further configured to at least obtain a new predicted position associated with the action by correcting a previously calculated predicted position associated with the action.

12. An information processing apparatus configured to communicate with another information processing apparatus, comprising:
at least one processor; and
a transceiver,
wherein the at least one processor is configured to at least:
receive, from the other information processing apparatus through the transceiver, game information about an action taken according to an input by a user of the other information processing apparatus and in connection with a first game display process of the other information processing apparatus, the action continuing on the other information processing apparatus during a first period;
based on the received game information, execute a second game display process related to the action that is taken later than a start of the first game display process related to the action in the first information processing apparatus, the action continuing during a second period that is shorter than the first period; and
send result information indicating a result of the second game display process to the other information processing apparatus using the transceiver.

13. The information processing apparatus according to claim 12, wherein the at least one processor is further configured to at least obtain a new predicted position associated with the action by correcting a previously calculated predicted position associated with the action.

14. The information processing apparatus according to claim 12, wherein
the at least one processor is further configured to at least control the action in the information processing apparatus based on a predicted position so that a time taken to complete the action in the other information processing apparatus is shorter than a time taken to complete the action in the information processing apparatus.

15. The information processing apparatus according to claim 14, wherein the at least one processor is further configured to at least cause the action to be generated while skipping a portion of the first action.

16. A non-transitory computer-readable storage medium having stored therein an information processing program to be executed by a computer in a second information processing apparatus configured to communicate with a first information processing apparatus, the information processing program causing the computer to at least execute:
receiving, from the first information processing apparatus through a transceiver of the second information processing apparatus, game information about an action taken according to an input by a user of the first information processing apparatus and in connection with a first game display process of the first information processing apparatus, the action continuing on the other information processing apparatus during a first period,
based on the received game information, executing a second game display process related to the action that is taken later than a start of the first game display process related to the action in the first information processing apparatus, the action continuing during a second period that is shorter than the first period, and
causing the transceiver of the second information processing apparatus to send result information indicating a result of the second game display process to the first information processing apparatus.

17. The non-transitory computer-readable storage medium according to claim 16, wherein the information processing program is further programmed to cause the computer to at least obtain a new predicted position associated with the action by correcting a previously calculated predicted position associated with the action.

18. The non-transitory computer-readable storage medium according to claim 16, wherein:
the information processing program is further programmed to cause the computer to at least:
control the action in the second information processing apparatus based on a predicted position so that a time taken to complete the action in the second information processing apparatus is shorter than a time taken to complete the action in the first information processing apparatus, and
cause the action to be generated while skipping a portion of the action.

19. An information processing method executable in an information processing system including a first information processing apparatus, and a second information processing apparatus configured to communicate with the first information processing apparatus,
- wherein the first information processing apparatus is configured to at least:
  - execute a first game display process related to an action according to an input by a user of the first information processing apparatus, the action continuing during a first period; and
  - send game information about the action to the second information processing apparatus, and
- wherein the second information processing apparatus is configured to at least:
  - receive the game information about the action from the first information processing apparatus;
  - execute a second game display process related to the action that is taken later than a start of the first game display process related to the action in the first information processing apparatus, based on the received game information, the action continuing during a second period that is shorter than the first period; and
  - send result information indicating a result of the second game display process to the first information processing apparatus.

20. The information processing method according to claim 19, wherein the second information processing apparatus is further configured to at least obtain a new predicted position associated with the action by correcting a previously calculated predicted position associated with the action.

* * * * *